US011392371B2

(12) United States Patent
Kikuchi

(10) Patent No.: US 11,392,371 B2
(45) Date of Patent: Jul. 19, 2022

(54) IDENTIFICATION OF A PARTIAL CODE TO BE REFACTORED WITHIN A SOURCE CODE

(71) Applicant: FUJITSU LIMITED, Kawasaki (JP)

(72) Inventor: Shinji Kikuchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 16/693,068

(22) Filed: Nov. 22, 2019

(65) Prior Publication Data

US 2020/0167152 A1 May 28, 2020

(30) Foreign Application Priority Data

Nov. 28, 2018 (JP) .............................. JP2018-222125

(51) Int. Cl.
*G06F 8/72* (2018.01)
*G06F 8/71* (2018.01)
*G06F 8/75* (2018.01)

(52) U.S. Cl.
CPC .................. *G06F 8/72* (2013.01); *G06F 8/71* (2013.01); *G06F 8/75* (2013.01)

(58) Field of Classification Search
None
See application file for complete search history.

(56) References Cited

U.S. PATENT DOCUMENTS 6,804,682 B1 * 10/2004 Kemper .................... G06F 8/72
8,689,191 B2 * 4/2014 Dolby ........................... 717/136

(Continued)

FOREIGN PATENT DOCUMENTS

JP 2006-59276 A 3/2006
JP 2011-258076 A 12/2011

(Continued)

OTHER PUBLICATIONS

A. Hora, N. Anquetil, S. Ducasse and M. T. Valente, "Mining system specific rules from change patterns," 2013 20th Working Conference on Reverse Engineering (WCRE), 2013, pp. 331-340, doi: 10.1109/WCRE.2013.6671308. (Year: 2013).*

(Continued)

*Primary Examiner* — Andrew M. Lyons
(74) *Attorney, Agent, or Firm* — Fujitsu Patent Center

(57) ABSTRACT

An apparatus stores, for each correction processing applied to a source code, a correction record including at least one of a deleted code deleted in the correction processing, an added code added in the correction processing, and attribute information related to the correction processing. The apparatus compares the deleted code with the added code in the correction records, and identifies a first correction processing that is refactoring to correct a first partial code within the source code without changing input/output of the first partial code. The apparatus identifies a second correction processing whose added code includes the deleted code deleted in the first correction processing. The apparatus determines a suspected attribute indicating an attribute of a partial code that is a refactoring candidate, and outputs, as the refactoring candidate, a second partial code that has been added in a third correction processing associated with the suspected attribute.

12 Claims, 22 Drawing Sheets

(56) References Cited

U.S. PATENT DOCUMENTS

| | | | |
|---|---|---|---|
| 9,063,742 B1* | 6/2015 | Bienkowski | G06F 8/71 |
| 9,417,867 B2* | 8/2016 | Abuelsaad | G06F 8/72 |
| 10,534,604 B1* | 1/2020 | Kimball | G06F 8/427 |
| 10,936,291 B1* | 3/2021 | Gamliel | G06F 8/72 |
| 2007/0055966 A1* | 3/2007 | Waddington | G06F 8/31 717/140 |
| 2009/0271766 A1* | 10/2009 | Luo | G06F 8/72 717/124 |
| 2010/0153940 A1* | 6/2010 | Remmel | G06F 8/72 717/168 |
| 2010/0269096 A1* | 10/2010 | Araya | G06F 16/8373 717/113 |
| 2011/0209132 A1* | 8/2011 | Faes | G06F 30/30 717/168 |
| 2011/0246968 A1* | 10/2011 | Zhang | G06F 8/751 717/125 |
| 2013/0104104 A1* | 4/2013 | Murthy | G06F 8/72 717/120 |
| 2014/0165035 A1* | 6/2014 | Campbell | G06F 8/72 717/121 |
| 2014/0289700 A1* | 9/2014 | Srinivasaraghavan | G06F 8/34 717/106 |
| 2016/0179653 A1* | 6/2016 | Suzuki | G06F 8/40 717/126 |
| 2016/0299831 A1* | 10/2016 | Cimadamore | G06F 8/75 |

FOREIGN PATENT DOCUMENTS

| | | |
|---|---|---|
| JP | 2016-143107 A | 8/2016 |
| JP | 2017-151594 A | 8/2017 |

OTHER PUBLICATIONS

M. Kessentini, W. Kessentini, H. Sahraoui, M. Boukadoum and A. Ouni, "Design Defects Detection and Correction by Example," 2011 IEEE 19th International Conference on Program Comprehension, 2011, pp. 81-90, doi: 10.1109/ICPC.2011.22. (Year: 2011).*

* cited by examiner

FIG. 2
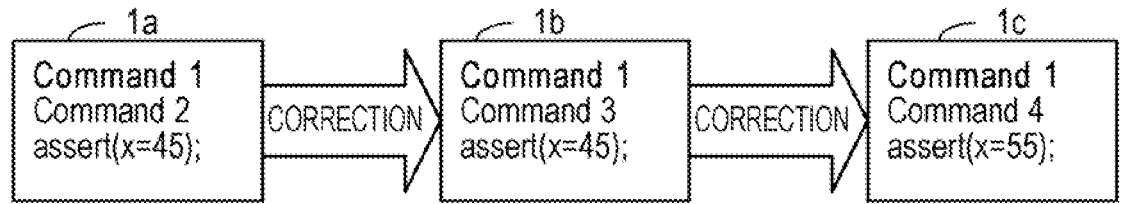

FIG. 8

| CHANGE ID | APPLICATION DATE AND TIME | CODER | ADDED CONTENTS | DELETED CONTENTS |
|---|---|---|---|---|
| C001 | 2018.1.5 | Coder A | x=0;<br>y=0;<br>i=0;<br>if(i<10){<br>   x=x+i;<br>   i++;}<br>assert(x=45); | (NONE) |
| C002 | 2018.1.6 | Coder B | for(i=0; i<10; i++){<br>   x+=i;} | i=0;<br>if(i<10){<br>   x=x+i;<br>   i++;} |
| C003 | 2018.1.9 | Coder C | for(i=0; i<11; i++){ | for(i=0; i<10; i++){ |
|  |  |  | assert(x=55); | assert(x=45); |

FIG. 9

| VERSION | CREATION DATE AND TIME | FINALLY APPLIED CHANGE ID | CODE CONTENTS |
|---|---|---|---|
| V1.0 | 2018.1.5 | - | /* Calculation */ |
| V1.1 | 2018.1.5 | C001 | /* Calculation */<br>x=0;<br>y=0;<br>i=0;<br>if(i<10){<br>   x=x+i;<br>   i++;}<br>assert(x=45); |
| V1.2 | 2018.1.6 | C002 | /* Calculation */<br>x=0;<br>y=0;<br>for(i=0; i<10; i++){<br>   x+=i;}<br>assert(x=45); |
| V1.3 | 2018.1.9 | C003 | /* Calculation */<br>x=0;<br>y=0;<br>for(i=0; i<11; i++){<br>   x+=i;}<br>assert(x=55); |

| CHANGE ID | APPLICATION DATE AND TIME | CODER | ADDED CONTENTS | DELETED CONTENTS |
|---|---|---|---|---|
| C001 | 2018.1.5 | Coder A | x=0;<br>y=0;<br>i=0;<br>if(i<10){<br>  x=x+i;<br>  i++;}<br>assert(x=55); | (NONE) |
| C002 | 2018.1.6 | Coder B | for(i=0; i<10; i++){<br>  x+=i;} | i=0;<br>if(i<10){<br>  x=x+i;<br>  i++;} |
| ... | ... | ... | ... | ... |

⬇ REFACTORING TARGET IDENTIFICATION

BECAUSE C002 IS CORRECTED FROM C001 AND assert IS NOT CHANGED, C001 IS REFACTORED CODE AND C002 IS REFACTORING CODE

FIG. 15

| CHANGE ID | APPLICATION DATE AND TIME | CODER | ADDED CONTENTS | DELETED CONTENTS |
|---|---|---|---|---|
| C001 | 2018.1.5 | Coder A | x=0;<br>y=0;<br>i=0;<br>if(i<10){<br>  x=x+i;<br>  i++;}<br>assert(x=55); | (NONE) |
| C002 | 2018.1.6 | Coder B | for(i=0; i<10; i++){<br>  x+=i;} | i=0;<br>if(i<10){<br>  x=x+i;<br>  i++;} |
| C003 | 2018.1.9 | Coder C | for(i=0; i<11; i++){ | for(i=0; i<10; i++){ |
| | | | assert(x=55); | assert(x=45); |

REFACTORING TARGET IDENTIFICATION

BECAUSE C003 IS CORRECTED FROM C002 BUT assert IS CHANGED, C003 IS NOT REFACTORING CODE.

| CHANGE ID | REFACTORING CODE OR NOT | REFACTORING TARGET | REFACTORED CODE OR NOT | REFACTORING CORRECTION PROCESSING |
|---|---|---|---|---|
| C001 | No | - | Yes | C002 |
| C002 | Yes | C001 | No | - |
| C003 | No | - | No | - |

IDENTIFICATION OF A PARTIAL CODE TO BE REFACTORED WITHIN A SOURCE CODE

CROSS-REFERENCE TO RELATED APPLICATION

This application is based upon and claims the benefit of priority of the prior Japanese Patent Application No. 2018-222125, filed on Nov. 28, 2018, the entire contents of which are incorporated herein by reference.

FIELD

The embodiments discussed herein are related to identification of a partial code to be refactored within a source code.

BACKGROUND

In software development, code called "technical debt" may be created. The technical debt refers to "codes that meet requirements for the operation of software, but are expected to be corrected later". Examples of the technical debt include codes that do not satisfy development rules such as variable naming rules, codes that may be simply described but are excessively complicated, and codes having low readability. The technical debt may be caused by precedence of the release timing over the quality of code, or variations in the developer's skill.

Such technical debt contributes to degradation of maintainability of code. For example, the technical debt may cause bugs, lead to the protraction of troubleshooting, and hinder understanding of code at extension. Therefore, it is desirable to previously remove the technical debt. To solve the technical debt, a target code is corrected so as to improve the readability or meet development rules without changing its input/output. Such code rewriting operation is called "refactoring".

A source code estimation system capable of objectively estimating the coding capacity of software engineers and companies to which software engineers belong has been proposed as a technique of assisting code correction.

Further, a quality check program that recognizes the tendency of each programmer with respect to matters that may affect the quality of the Java (registered trademark) source code has been proposed. An efficient program analysis method of identifying the source code that truly requires refactoring without extracting the complicated source code requiring no refactoring has been also proposed. In addition, an assistance apparatus that enables efficient correction and analysis of failures included in the source code has been proposed.

Japanese Laid-open Patent Publication Nos. 2006-59276, 2011-258076, 2016-143107, and 2017-151594 are examples of the related art.

SUMMARY

According to an aspect of the embodiments, an apparatus storing, in a memory, a correction record for each of a plurality of correction processings applied to a source code, where the stored correction record includes at least one of a deleted code deleted in the correction processing, an added code added in the correction processing, and attribute information indicating an attribute related to the correction processing. The apparatus compares the deleted code with the added code in the correction records of the plurality of correction processings, and identifies, from the plurality of correction processings, a first correction processing that is refactoring to correct a first partial code within the source code without changing input/output of the first partial code. The apparatus, based on a first correction record relating to the first correction processing, identifies a second correction processing whose added code includes the deleted code deleted in the first correction processing. The apparatus, based on the attribute information indicated in a second correction record relating to the second correction processing, determines a suspected attribute indicating an attribute of a partial code that is a refactoring candidate, and outputs, as the refactoring candidate, a second partial code that has been added in a third correction processing associated with the suspected attribute.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a correction candidate identification method;

FIG. 8 is a diagram illustrating an example of a code correction history management table;

FIG. 9 is a diagram illustrating an example of a master code management table;

FIG. 14 is a diagram illustrating a first example of refactoring target identification processing;

FIG. 15 is a diagram illustrating a second example of the refactoring target identification processing;

FIG. 16 is a diagram illustrating an example of refactoring target information;

DESCRIPTION OF EMBODIMENTS

In current refactoring, the engineers who perform code correction visually check all codes with care, and find a candidate technical debt place. Then, the engineers check contents of the candidate technical debt place in more detail to determine whether or not the candidate corresponds to the true technical debt. However, it is difficult for the engineers to visually check a large number of software codes and identify the candidate technical debt place to be refactored from the codes within a short time.

It is preferable to easily identify possible technical debt places.

Hereinafter, embodiments will be described with reference to the drawings. The embodiments are able to be implemented by combining a plurality of embodiments without any contraction.

First Embodiment

First, a first embodiment will be described. In the first embodiment, a correction candidate identification method of automatically identifying the candidate technical debt place for correction is implemented using a computer.

Figure 1:
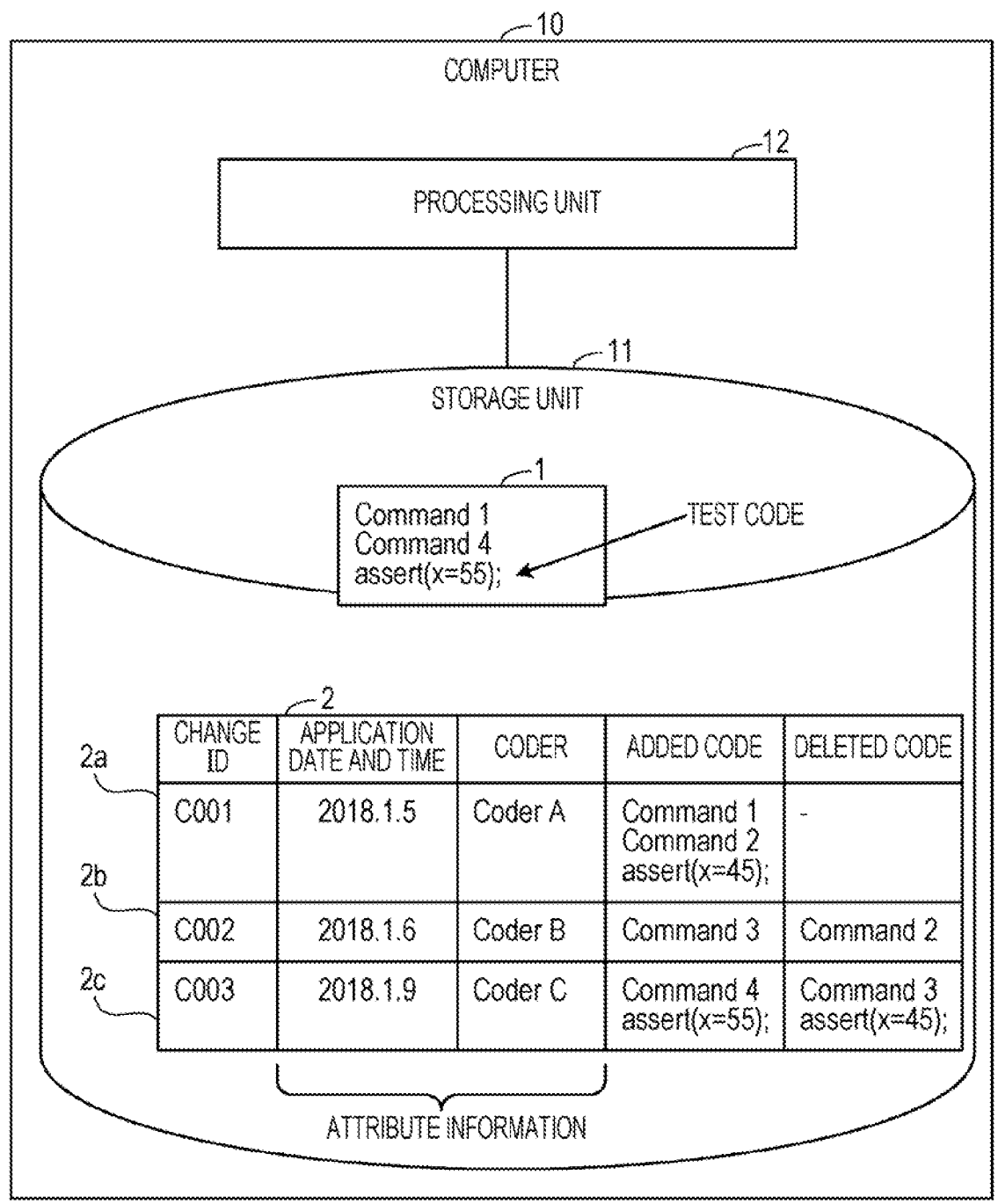
FIG. 1 is a diagram illustrating an example of a computer in accordance with a first embodiment.

FIG. 1 is a diagram illustrating an example of the computer in the first embodiment. FIG. 1 illustrates the computer 10 that implements the correction candidate identification method of automatically identifying the candidate technical debt place for correction. For example, the computer 10 executes a correction candidate identification program describing a procedure of the correction candidate identification method, thereby implementing the correction candidate identification method.

To implement the correction candidate identification method, the computer 10 has a storage unit 11 and a processing unit 12. The storage unit 11 is, for example, a memory or a storage device of the computer 10. The processing unit 12 is, for example, a processor or an arithmetic circuit of the computer 10.

The storage unit 11 stores a source code 1 to be corrected. The source code 1 includes one or more command lines. The command lines may include a test code indicating a conditional expression expected to hold at execution of the command lines. The test code is used to determine whether or not, about partial code that is a part of the source code 1, an input value or an output value is proper. In the execution process of the source code 1, if it is determined that the value in the test code is proper, the execution of the source code 1 continues. On the contrary, in the execution process of the source code 1, if it is determined that the value in the test code is improper, the execution of the source code 1 is terminated.

The storage unit 11 may store a correction history 2 for the source code 1. In the correction history 2, correction records 2a to 2c that indicate respective correction contents of the source code 1 are arranged in time series.

The correction records 2a to 2c each include change ID, application date and time, coder, added code, and deleted code, for example. The change ID is an identifier of correction processing. The application date and time is date and time when correction processing is executed. In the example illustrated in FIG. 1, only date is described, and time is omitted. In following description, time may be omitted from information about the date and time. The coder is a name of a developer who created a code added by correction (added code). The added code is one or more command lines added to the source code 1 in the correction processing. The deleted code is one or more command lines deleted from the source code 1 in the correction processing. Among the information included in the correction records 2a to 2c, the application date and time and the coder are examples of attribute information indicating attributes related to the correction processing.

The processing unit 12 of the computer 10 creates the correction history 2 corresponding to the correction processing of the source code 1, and automatically identifies the candidate technical debt place for correction based on the correction history 2.

FIG. 2 is a diagram illustrating an example of the correction candidate identification method. For example, it is assumed that the source code 1 is subjected to the correction processing twice. In FIG. 2, the contents of the source code 1 of a first version of are defined as a source code 1a, the contents of the source code 1 of a second version are defined as a source code 1b, and contents of the source code 1 of a third version are defined as a source code 1c.

It is assumed that the source code 1a of the first version is created by the developer "Coder A" and registered in the computer 10 on Jan. 5, 2018. In this case, the processing unit 12 of the computer 10 recognizes correction processing of newly adding all command lines in the registered source code 1a, and registers the correction record 2a indicating the correction processing in the correction history 2. The registered correction record 2a includes the change ID "C001", the application date and time "2018.1.5", and the coder "Coder A". The added code in the correction record 2a includes all command lines in the source code 1a.

Next, it is assumed that the source code 1a of the first version is corrected by the developer "Coder B", and the corrected source code 1b of the second version is registered in the computer 10 on Jan. 6, 2018. In this case, the processing unit 12 registers the correction record 2b indicating correction processing of correcting the source code 1a to the source code 1b in the correction history 2. The registered correction record 2b includes the change ID "C002", the application date and time "2018.1.6", and the coder "Coder B". The added code in the correction record 2b includes the command lines newly added to the source code 1b, and the deleted code includes the command line deleted from the initial source code 1a.

Next, it is assumed that the source code 1b of the second version is corrected by the developer "Coder C", and the corrected source code 1c of the third version is registered in the computer 10 on Jan. 9, 2018. In this case, the processing unit 12 registers the correction record 2c indicating the correction processing of correcting the source code 1b to the source code 1c in the correction history 2. The registered correction record 2c includes the change ID "C003", the application date and time "2018.1.9", and the coder "Coder C". The added code in the correction record 2c includes the command lines newly added to the source code 1c, and the deleted code includes the command lines deleted from the initial source code 1b.

For example, when receiving a correction candidate identification request designating any of the versions of the source code 1, the processing unit 12 executes correction candidate identification processing. It is assumed that the correction candidate identification request designating the source code 1c of the latest version is inputted.

In response to the correction candidate identification request, the processing unit 12 compares the deleted code with the added code indicated in each of the correction records 2a to 2c of the plural pieces of correction processing, and identifies the first correction processing, in which the code was refactored without changing its input/output, from the pieces of correction processing. For example, if the deleted code is present and no test code is changed in one of the pieces of correction processing, the processing unit 12 identifies the one piece of correction processing as the first correction processing.

In the example illustrated in FIG. 2, in the correction record 2a indicating the processing of registering the source code 1a of the first version, the added code is present, and the deleted code is not present. That is, in the correction processing corresponding to the correction record 2a, only addition of the new command lines is performed. Since the new input/output occurs in the added code, the processing unit 12 determines that the correction processing indicated in the correction record 2a is not refactoring of correcting the code without changing the input/output of the processing.

In the correction record 2b indicating the processing of correcting the source code 1a of the first version to the source code 1b of the second version, the deleted code is changed to the added code. The deleted code and the added code do not include the test code. For this reason, the processing unit 12 determines that the correction processing corresponding to the correction record 2b is refactoring of correcting the code without changing the input/output of the processing. As a result, the processing unit 12 identifies the correction processing indicated in the correction record 2b as the first correction processing.

In the correction record 2c indicating the processing of correcting the source code 1b of the second version to the source code 1c of the third version, the deleted code is changed to the added code. The deleted code and the added code include the test code, and have different variables checked in the test code. For this reason, the processing unit 12 determines that the correction processing corresponding to the correction record 2c is not refactoring.

After identifying the first correction processing, based on the first correction record (correction record 2b) of the first correction processing, the processing unit 12 identifies second correction processing including the deleted code deleted in the first correction processing in the added code. For example, the correction record 2b records the deleted code "Command 2". The deleted code is included in the added code in the correction record 2a. Accordingly, the processing unit 12 identifies the correction processing corresponding to the correction record 2a as the second correction processing.

After identifying the second correction processing, the processing unit 12 determines a suspected attribute indicating the attribute of the partial code that is a refactoring candidate, based on the attribute information indicated in the second correction record (correction record 2a) of the second correction processing. For example, the processing unit 12 calculates, about a value of one attribute item indicated in the attribute information in the correction records 2a to 2c of the plural pieces of correction processing, the ratio of the number of occurrences in the second correction record of the second correction processing to the number of occurrences in the correction records of the plural pieces of correction processing. If the calculated ratio is equal to or larger than a threshold value, the processing unit 12 determines the value of the one attribute item as the suspected attribute. The threshold value is a real number that is larger than 0 and is equal to or smaller than 1.

Examples of the attribute item indicated in the attribute information include the application date and time, and the identifier of the coder (for example, name of the coder). Noting the identifier of the coder as the attribute item, the identifier of the coder in the second correction record (correction record 2a) is "Coder A". The coder having the identifier "Coder A" executed the correction processing once and thus, the number of occurrences of the "Coder A" in the correction record is "1". The number of occurrences of the coder having the identifier "Coder A" in the second correction record of the second correction processing is also "1". The ratio of the occurrence of the identifier "Coder A" in the second correction record to the number of occurrences in the correction record is "1 (100%)". In this case, the processing unit 12 determines the identifier "Coder A" of the coder as the suspected attribute (suspected coder).

Noting the application date and time as the attribute item, the application date and time indicated in the second correction record (correction record 2a) is "2018.1.5". Every one week (seven days), the processing unit 12 determines whether or not a concerned period is the suspected attribute. If a target period to which "2018.1.5" belongs falls within "2017.12.30-2018.1.5", the correction processing was executed in the concerned period only once, and the number of occurrences of the date and time during the concerned period in the correction record is "1". The number of occurrences of the date and time during the period "2017.12.30-2018.1.5" in the second correction record of the second correction processing is also "1". The ratio of occurrences the date and time during the period "2017.12.30-2018.1.5" in the second correction record to the number of occurrences in the correction record is "1 (100%)". In this case, the processing unit 12 determines the application date and time indicated in the second correction record (correction record 2a), that is, the period "2017.12.30-2018.1.5" including "2018.1.5" as the suspected attribute (suspected period).

After determining the suspected attribute, the processing unit 12 outputs a partial code, which is added to the source code 1c of the latest version in the correction processing having the suspected attribute (suspected correction processing) and remains in the source code 1c, as the refactoring candidate. In the example illustrated in FIG. 1, a command statement "Command 1" added by the suspected coder in the suspected period is outputted as the refactoring candidate.

The computer 10 automatically identifies and outputs the refactoring candidate in this manner, thereby easily identifying the technical debt place. That is, the developer who performs refactoring may check the command lines indicated as the refactoring candidate and other descriptions related to the command lines to determine whether or not the code is the technical debt place. As a result, for example, as compared to the case of checking the entire description of the source code 1c, the technical debt place may be identified more easily.

Moreover, the processing unit 12 determines whether or not the input/output is changed by correction depending on the presence or absence of a change of the test code. This may correctly determine whether or not the executed correction processing is refactoring.

If the ratio of the occurrence of a value of a certain attribute item in the second correction record is equal to or larger than the threshold value, the processing unit 12 determines the value of the attribute item as the suspected attribute. Thereby, only the partial code that is likely to be the technical debt place may be determined as the refactoring candidate.

The processing unit 12 may determine the identifier of the coder as the suspected attribute. Accordingly, the technical debt place occurring due to the coder, such as the coder's inability, may be appropriately identified as the refactoring candidate.

The processing unit 12 may determine the period including the application date and time of the correction processing as the suspected attribute. In this manner, for example, the period during which optimization may not be sufficiently performed to do in time for development deadline may be determined as the suspected attribute (suspected period). Thus, the technical debt place that may not be removed in terms of processes in software development may be appropriately identified as the refactoring candidate.

If a plurality of suspected attributes are present, for example, the processing unit 12 outputs a partial code having attributes corresponding to the plurality of suspected attributes (logical product of the suspected attributes) as the refactoring candidate. If a plurality of suspected attributes are present, the processing unit 12 may output a partial code having an attribute corresponding to at least one of the plurality of suspected attributes (logical sum of the suspected attributes) as the refactoring candidate.

Second Embodiment

Next, a second embodiment will be described. The second embodiment is a system for assisting efficient refactoring in the development environment of open-source software (OSS).

In OSS and so on, "social coding" in which many developers develop software in an asynchronous and parallel manner has been popular. At present, code repository services for social coding are available. In the code repository services, submission and approval of code, and exchange of information including discussions and comments for the social coding may be performed online. For example, a server for the code repository service is installed in one company to assist the social coding between developers belonging to the company.

Figure 3:
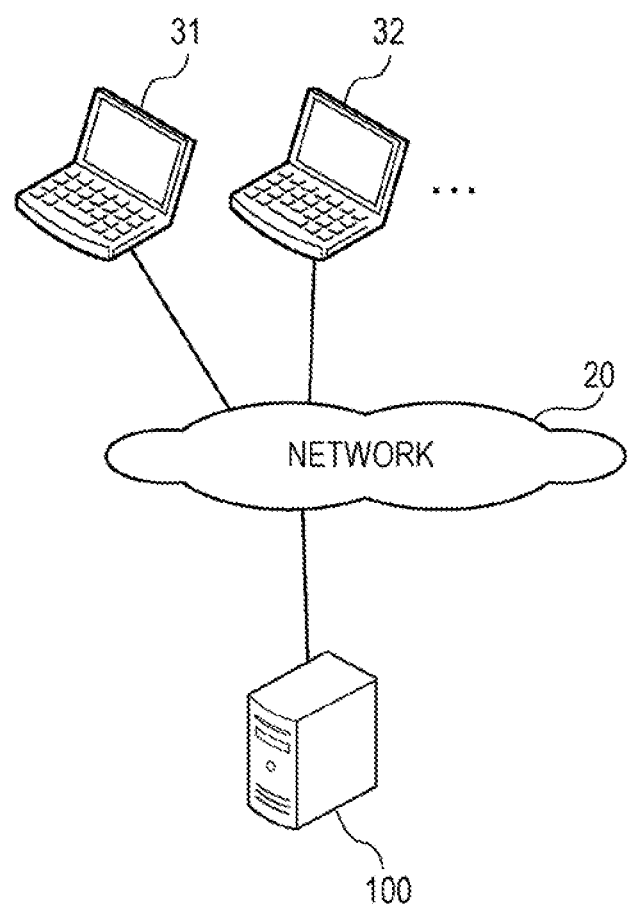
FIG. 3 is a diagram illustrating an exemplary system configuration in accordance with a second embodiment.

FIG. 3 is a diagram illustrating an exemplary system configuration in accordance with the second embodiment. A server 100 is coupled to a plurality of terminal devices 31, 32, . . . via a network 20. The server 100 is a computer that realizes a social coding base. The terminal devices 31, 32, . . . each are a computer used by a software developer or reviewer.

Figure 4:
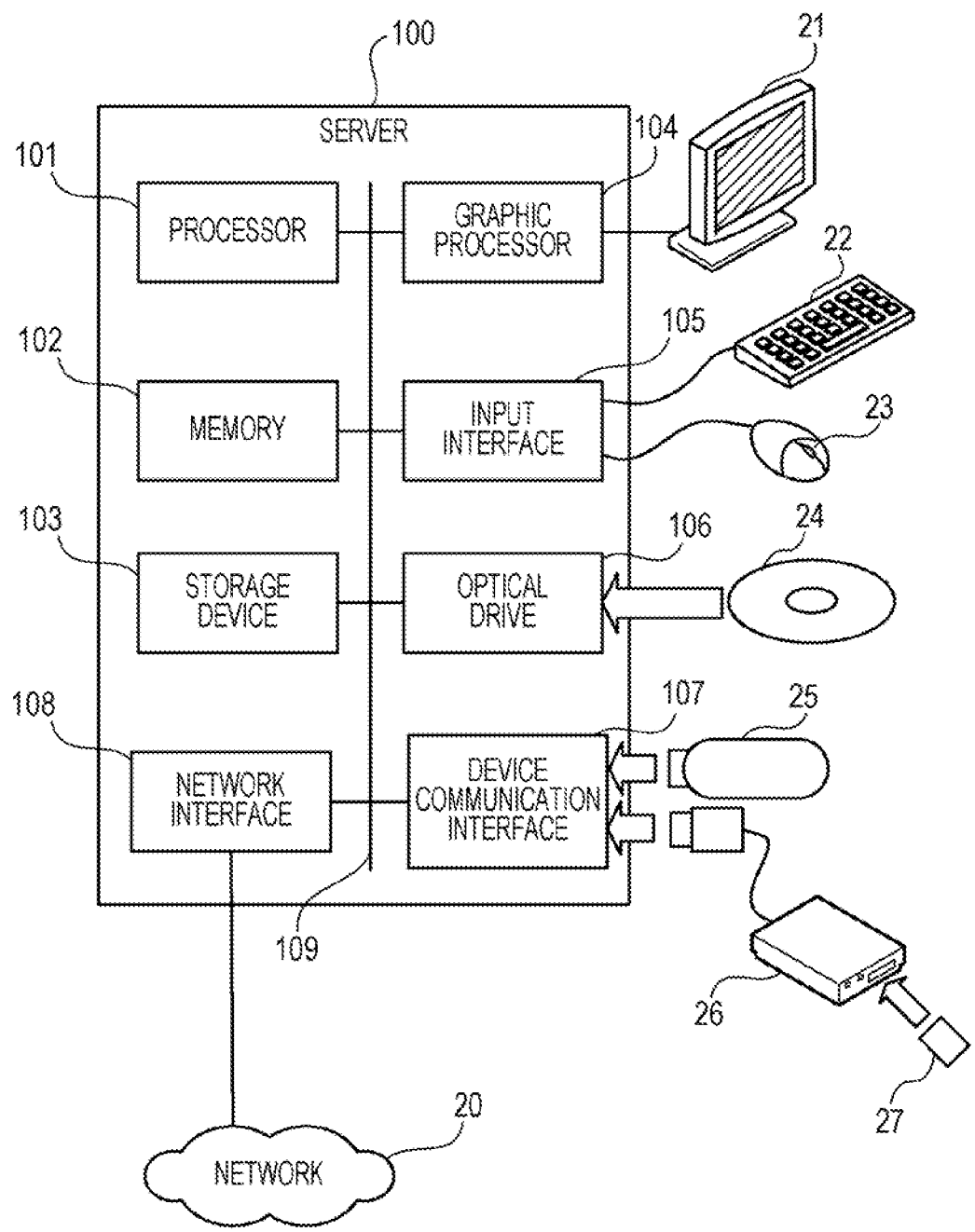
FIG. 4 is a diagram illustrating an exemplary hardware configuration of a server.

FIG. 4 is a diagram illustrating an exemplary hardware configuration of the server. The server 100 is entirely controlled by a processor 101. A memory 102 and a plurality of peripheral devices are coupled to the processor 101 via a bus 109. The processor 101 may be a multiprocessor. The processor 101 is, for example, a central processing unit (CPU), a microprocessor unit (MPU), or a digital signal processor (DSP). At least a part of functions implemented by the processor 101 executing a program may be implemented by an electronic circuit such as an application specific integrated circuit (ASIC) or a programmable logic device (PLD).

The memory 102 is used as a main storage device of the server 100. The memory 102 temporarily stores at least some of operating system (OS) programs and application programs executed by the processor 101. The memory 102 stores various kinds of data items to be used in processing by the processor 101. For example, a random-access memory (RAM) such as a volatile semiconductor storage device is used as the memory 102.

Examples of the peripheral devices coupled to the bus 109 include a storage device 103, a graphic processing device 104, an input interface 105, an optical drive device 106, a device communication interface 107, and network interface 108.

The storage device 103 electrically or magnetically writes and reads data to and out from a built-in recording medium. The storage device 103 is used as an auxiliary storage device of a computer. The storage device 103 stores an OS program, an application program, and various data. For example, a hard disk drive (HDD) or a solid state drive (SSD) is able to be used as the storage device 103.

A monitor 21 is coupled to the graphic processing device 104. The graphic processing device 104 displays an image on a screen of the monitor 21 in accordance with a command from the processor 101. Examples of the monitor 21 include a display device using an organic electroluminescence (EL) and a liquid crystal display device.

A keyboard 22 and a mouse 23 are coupled to the input interface 105. The input interface 105 transmits a signal sent from the keyboard 22 and the mouse 23 to the processor 101. The mouse 23 is an example of a pointing device, and other pointing devices are able to be used. Examples of the pointing devices include a touch panel, a tablet, a touch pad, and a trackball.

The optical drive device 106 reads data recorded in an optical disk 24 by using a laser beam. The optical disk 24 is a portable recording medium on which data is recorded so as to be readable via light reflection. The optical disk 24 includes a digital versatile disc (DVD), DVD-RAM, a compact disc-read only memory (CD-ROM), CD-Recordable (R)/Rewritable (RW) and the like.

The device communication interface 107 is a communication interface for coupling a peripheral device to the server 100. For example, a memory device 25 and a memory reader and writer 26 are able to be coupled to the device communication interface 107. The memory device 25 is a recording medium having a function of communicating with the device communication interface 107. The memory reader and writer 26 is a device for writing data to a memory card 27 or reading data from the memory card 27. The memory card 27 is a card-type recording medium.

The network interface 108 is coupled to the network 20. The network interface 108 transmits and receives data to and from another computer or communication equipment via the network 20.

With the hardware configuration described above, the server 100 is able to implement processing functions of the second embodiment. The computer 10 in the first embodiment may be also embodied as the same hardware as the server 100 illustrated in FIG. 4.

For example, the server 100 implements the processing functions of the second embodiment by executing a program recorded in a computer-readable recording medium. A program in which content of processing to be executed by the server 100 may be recorded in various recording media. For example, the program to be executed by the server 100 is able to be stored in the storage device 103. The processor 101 loads at least a part of programs within the storage device 103 into the memory 102, and executes the program. The program to be executed by the server 100 is able to be recorded in a portable recording medium such as the optical disk 24, the memory device 25, or the memory card 27. For example, the program stored in the portable recording medium is able to be executed after this program is installed on the storage device 103 under the control of the processor 101. The processor 101 is able to directly read out the program from the portable recording medium, and is able to execute the program.

Next, the social coding will be described with reference to FIG. 5.

Figure 5:
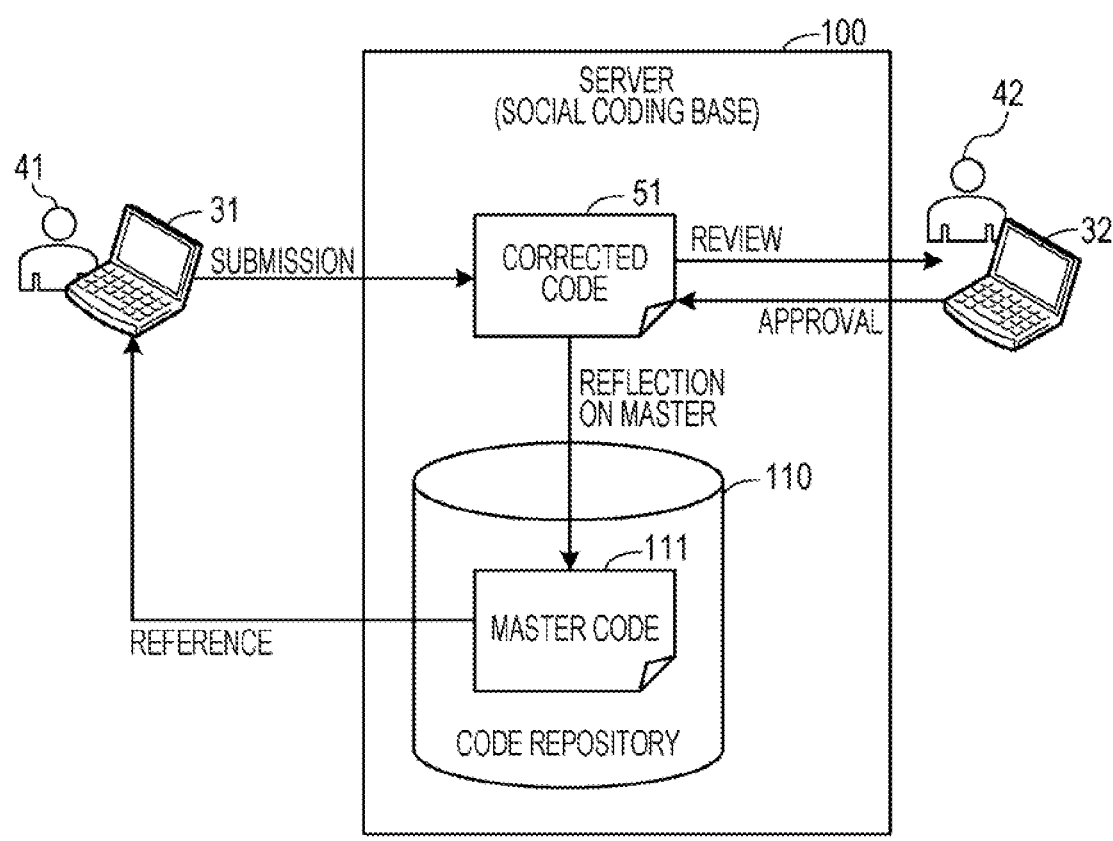
FIG. 5 is a diagram for describing social coding.

FIG. 5 is a diagram for describing the social coding. The server 100 functioning as the social coding base has a code repository 110 that stores a master code 111. The master code 111 is a source code of a program of formal version. The master code 111 is stored in the repository as, for example, one file (source file). A developer 41 accesses the server 100 using, for example, the terminal device 31 and refers to the master code 111 in the code repository 110. The developer 41 uses the terminal device 31 to add a function to the master code 111, correct a failure, or create corrected code 51 for refactoring. The developer 41 allows the terminal device 31 to transmit the corrected code 51 to the server 100.

The transmitted corrected code 51 is held in the server 100. After that, a reviewer 42 uses, for example, the terminal device 32 to refer to the corrected code 51 and review it. If the corrected code 51 has no problem, the reviewer 42 uses the terminal device 32 to transmit a message indicating an approval to the server 100. When the corrected code 51 is approved, the server 100 reflects correction contents described in the corrected code 51 on the master code 111.

When the developer 41 applies refactoring to the master code 111, the developer 41 first identifies a partial code to be refactored from the master code 111. At this time, in the case where the master code 111 is a large-scale program, it is difficult for the developer 41 to visually check all partial codes and identify the partial code to be refactored. Thus, the server 100 extracts, as the refactoring candidate, the partial code that is likely to be refactored from the master code 111. The server 100 transmits the refactoring candidate to the terminal device 31 used by the developer 41.

Figure 6:
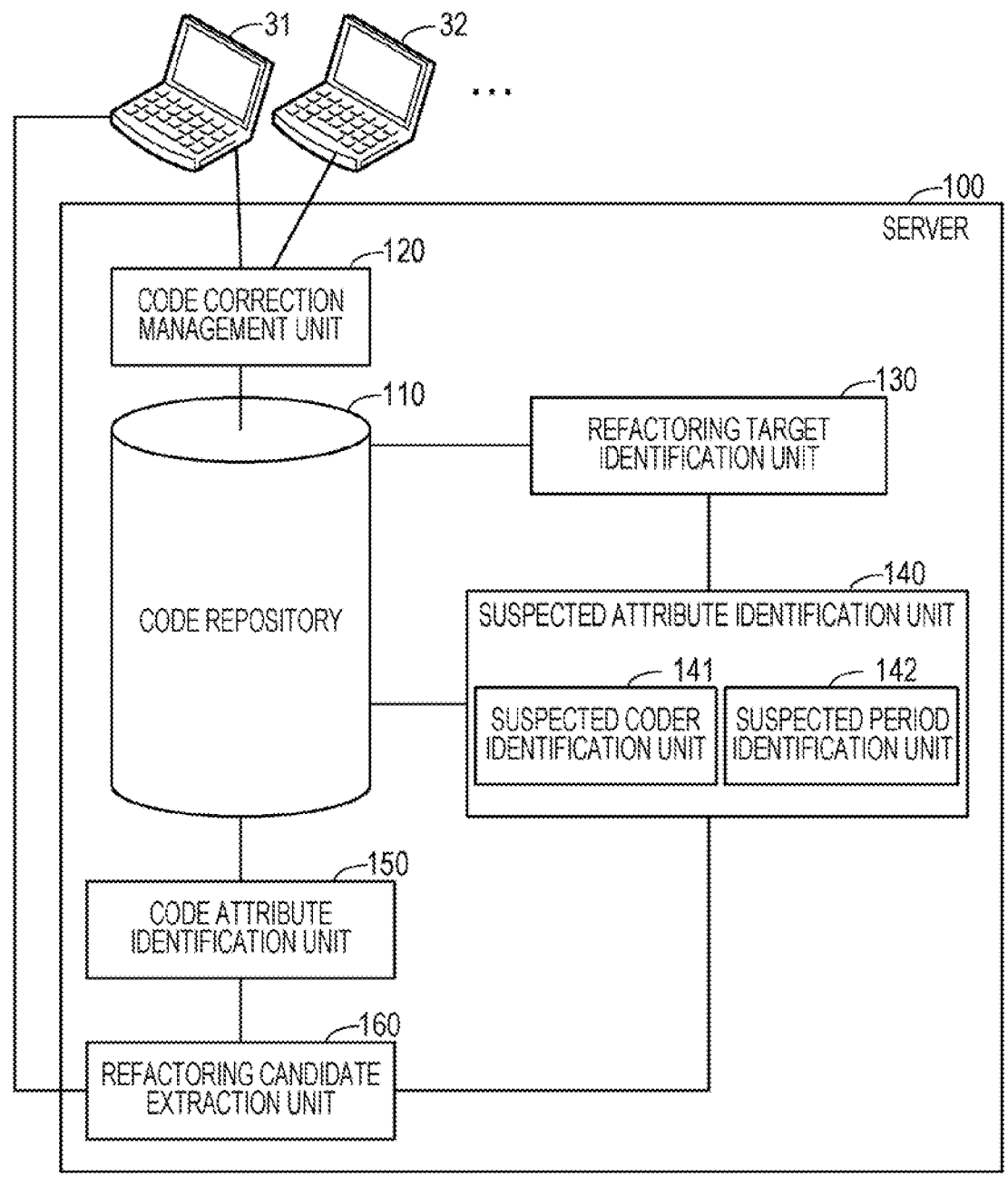
FIG. 6 is a block diagram illustrating functions of a server.

FIG. 6 is a block diagram illustrating functions of the server. The server 100 has, in addition to the code repository 110 illustrated in FIG. 5, a code correction management unit 120, a refactoring target identification unit 130, a suspected attribute identification unit 140, a code attribute identification unit 150, and a refactoring candidate extraction unit 160.

The code repository 110 stores the source code of the corrected master code of each updated version and the correction records indicating correction contents of the corrected code 51.

The code correction management unit 120 manages correction of the master code. For example, the code correction management unit 120 communicates with the terminal devices 31, 32, . . . used by the developer or reviewer and manages a series of procedure of social coding as illustrated in FIG. 5.

The refactoring target identification unit 130 identifies the partial code added for refactoring from the master code registered in the code repository 110. For example, the refactoring target identification unit 130 identifies the uncorrected partial code to be corrected by the corrected code, which satisfies both of two following conditions, as a refactoring target. The created partial code is overwritten with another partial code. Test code is not corrected.

The test codes are set prior to and subsequent to one partial code in a program to confirm whether or not a value of a variable is as estimated. For example, the test code is used to check whether or not an estimated input value is inputted, or an estimated output value is outputted. That the test code is not corrected means that there is no change in input/output at the corrected place, and the object of correction is likely to be refactoring.

For example, the suspected attribute identification unit 140 identifies a frequently occurring attribute among a plurality of attributes (coder, application date and time, for example) of the refactoring target. For example, the suspected attribute identification unit 140 has a suspected coder identification unit 141 and a suspected period identification unit 142.

The suspected coder identification unit 141 identifies the frequently occurring coder that is the attribute of the refactoring target as the suspected coder. The suspected coder is the developer who frequently created the partial codes that would be refactoring targets and accordingly, uncorrected partial code created by this developer is likely to be the refactoring target.

For example, if update processing of adding the partial code that would be the refactoring target is frequently included in master code update processing executed during a certain period, the suspected period identification unit 142 identifies the period as the suspected period. The suspected period is the period during which the partial codes that would be the refactoring targets were frequently applied and thus, uncorrected partial code applied in the concerned period is likely to be the refactoring target.

The code attribute identification unit 150 identifies the attribute of partial code included in the master code. For example, concerning partial code added at correction, the code attribute identification unit 150 identifies the coder of the partial code or the date and time when the partial code was applied.

The refactoring candidate extraction unit 160 extracts a partial code that is the refactoring candidate from the master code. For example, the refactoring candidate extraction unit 160 identifies the partial code of the attribute corresponding to the suspected coder or the suspected period as the refactoring candidate. The refactoring candidate extraction unit 160 transmits the refactoring candidate to the terminal device (for example, the terminal device 31) used by the developer performing refactoring.

A line coupling the elements to each other in FIG. 6 represent an example of a communication path and any other communication path other than the illustrated may be set. The functions of the elements illustrated in FIG. 6 are able to be implemented by causing a computer to execute program modules corresponding to the elements.

Next, information stored in the code repository 110 will be described in detail.

Figure 7:
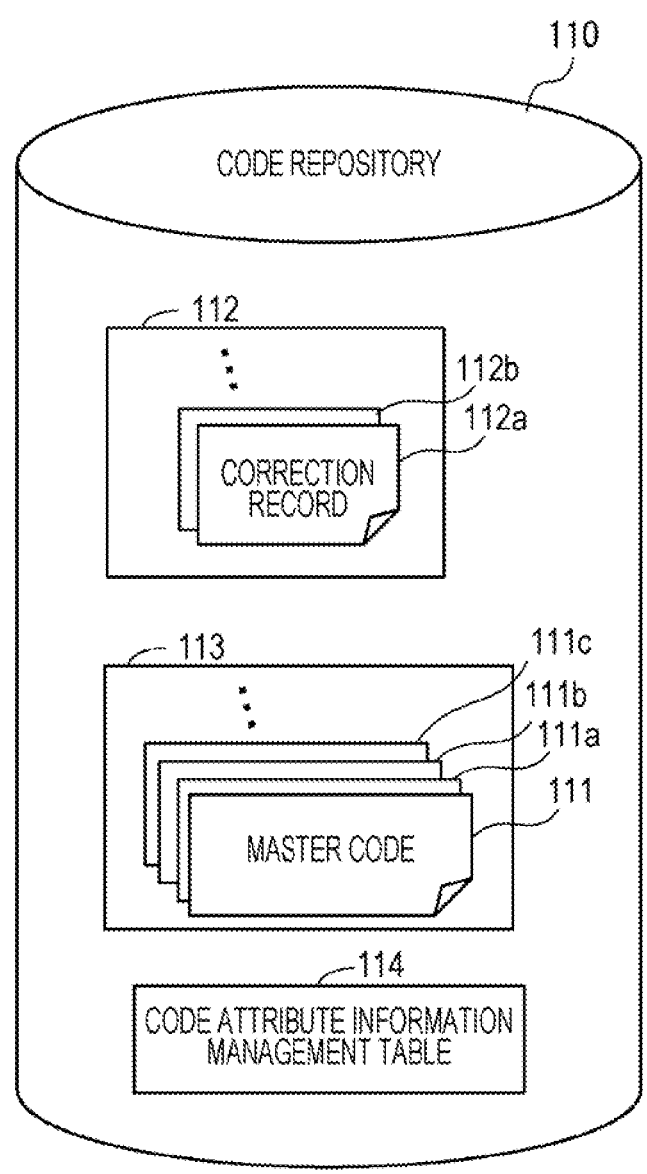
FIG. 7 is a diagram illustrating an example of a code repository.

FIG. 7 is a diagram illustrating an example of the code repository. The code repository 110 stores a code correction history management table 112, a master code management table 113, and a code attribute information management table 114.

The code correction history management table 112 is a data table for managing correction records 112a, 112b, . . . about the master code. The code correction history management table 112 registers the correction records 112a, 112b, . . . indicating respective code correction contents.

The master code management table 113 is a data table for managing created master codes 111, 111a, 111b, 111c, . . . . The master code management table 113 registers the initially created master code 111 and the master codes 111a, 111b, 111c, . . . corrected later.

The code attribute information management table 114 is a data table for managing attributes (coder, application date and time, for example) for each command line in the latest master code 111c. The code attribute information management table 114 is updated to include latest information each time the master code is corrected.

FIG. 8 is a diagram illustrating an example of the code correction history management table. The code correction history management table 112 has columns for change ID, application date and time, coder, added contents, and deleted contents. The identifier (change ID) of the correction processing of the master code is set in the change ID column. The date and time when the corrected code was applied to the master code is set in the application date and time column. The name of the developer who created added code is set in the coder column. The partial code added to the master code by application of the corrected code is set in the added contents column. The partial code deleted from the master code by application of the corrected code is set in the deleted contents column.

FIG. 9 is a diagram illustrating an example of the master code management table. The master code management table 113 has columns for version, creation date and time, finally applied change ID, and code contents. The version of master code is set in the version column. The date and time when master code of corresponding version was created is set in the creation date and time column. The change ID of the corrected code finally applied to master code of corresponding version is set in the change ID column. Contents of master code of corresponding version are set in the code contents column. In place of the master code, information indicating the source file describing master code (file path and file name) may be set in the code contents column.

In the example illustrated in FIG. 9, code contents of a version "V1.0" represent the initially created master code 111. Code contents of versions "V1.1", "V1.2", and "V1.3" represent master codes 111a, 111b, 111c generated by correction, respectively.

The code attribute information management table 114 is updated each time corrected code is applied to master code. Hereinafter, with reference to FIGS. 10 to 12, update contents of the code attribute information management table 114 will be described.

Figure 10:
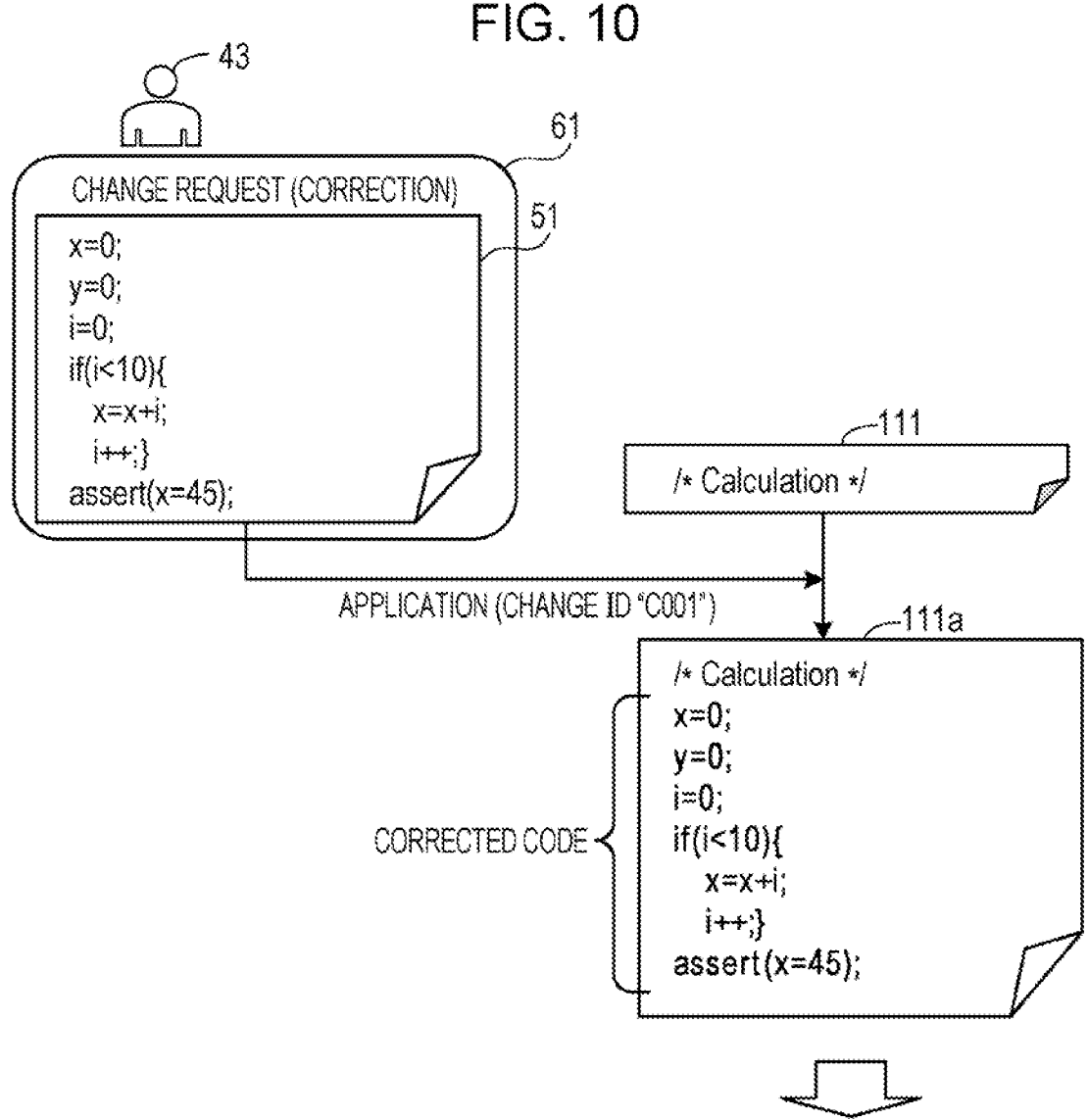
FIG. 10 is a diagram illustrating a first update example of a code attribute information management table.

FIG. 10 is a diagram illustrating a first update example of the code attribute information management table. It is assumed that a developer 43 (name "Coder A") created the corrected code 51 with respect to the master code 111 of the version "V1.0". The developer 43 uses the terminal device to a change request 61 requesting addition of the corrected code 51 to the server 100. For example, the developer 43 uses the terminal device to log in the server 100 with an account of the user name "Coder A". The developer 43 inputs the change request 61 to the server 100 with the log-in account. The change request 61 includes the corrected code 51.

In the server 100, in response to the change request 61, the code correction management unit 120 applies contents of the corrected code 51 to the master code 111. This generates the master code 111a of the version "V1.1". The partial code indicated in the corrected code 51 is added to the master code 111a of the version "V1.1". At this time, the code correction management unit 120 assigns the change ID to the correction processing to which the corrected code 51 is applied. In the example illustrated in FIG. 10, the change ID "C001" is assigned.

When the corrected code 51 is applied to the master code 111, the code attribute identification unit 150 updates the code attribute information management table 114. The code attribute information management table 114 has columns for line number, command, change ID, date and time, and coder. The line number of each command line in the source code is set in the line number column. The character string in the command line having corresponding line number is set in the command column. The change ID of correction processing of adding the command line having corresponding line number is set in the change ID column. The date and time when the corrected code was applied is set in the date and time column. The name of the developer who created the corrected code is set in the coder column. The name of the developer is, for example, the user name having an account with which the change request is made.

For example, before application of the corrected code 51, only a command "/*Calculation*/" in a command line having the line number "1" is present in the code attribute information management table 114. When the corrected code 51 is applied, the code attribute identification unit 150 adds records of line numbers "2" to "8" to the code attribute information management table 114. The command lines indicated in the corrected code 51 are set in the command column of each record. In the added record, the change ID is "C001", the date and time is "2018.1.5" (Jan. 5, 2018), and the coder is "Coder A".

Figure 11:
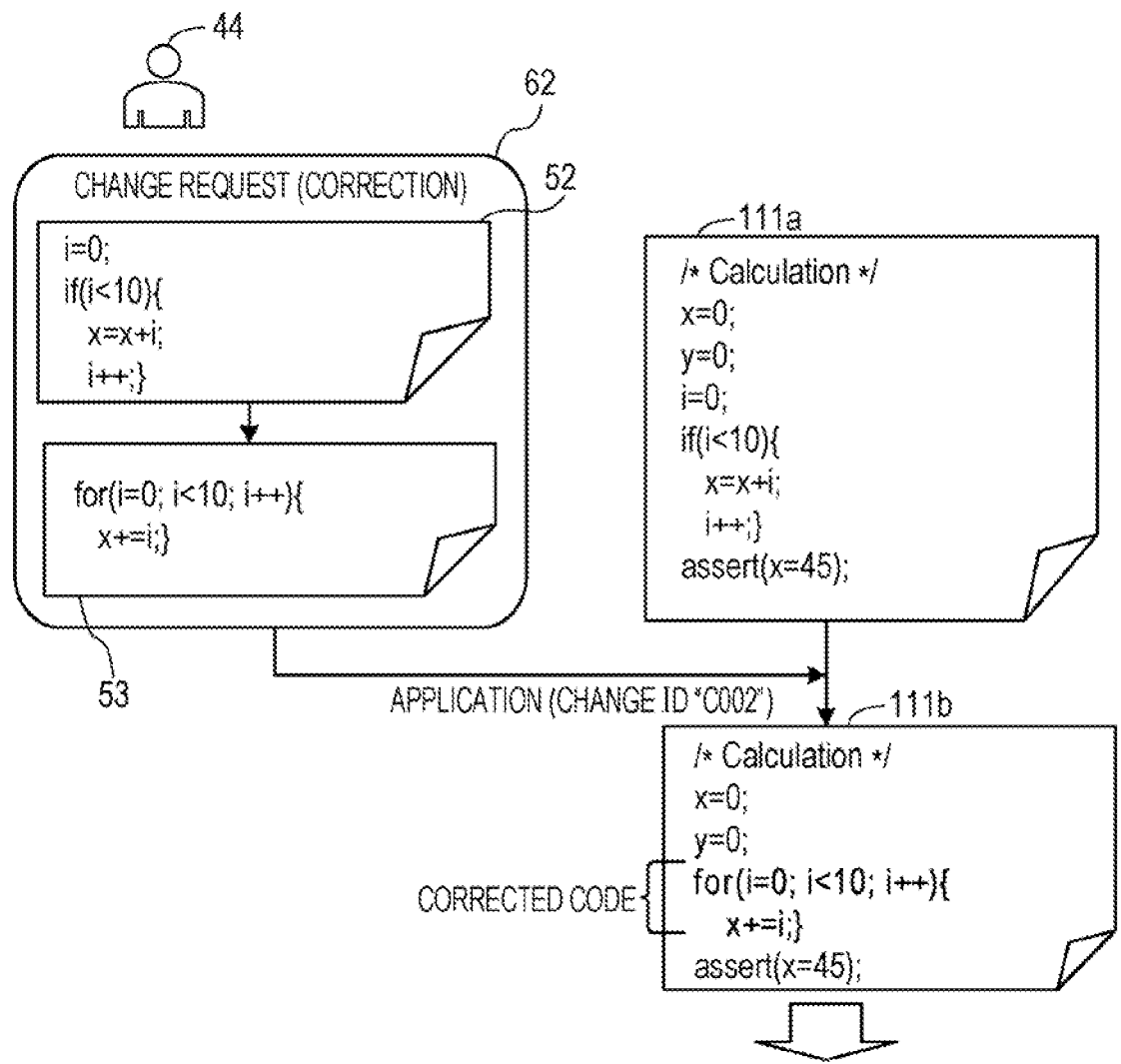
FIG. 11 is a diagram illustrating a second update example of the code attribute information management table.

FIG. 11 is a diagram illustrating a second update example of the code attribute information management table. For example, it is assumed that a developer 44 (name "Coder B") created a corrected code 53 with respect to the master code 111a of the version "V1.1". The corrected code 53 is the partial code inserted into the place where the partial code in the master code 111a (deleted code 52) was deleted. In this case, the developer 44 uses the terminal device to transmit a change request 62 requesting correction from the deleted code 52 to the corrected code 53 to the server 100. The change request 62 includes the deleted code 52 and the corrected code 53. The change request 62 may include the line number of the deleted code 52 in the master code 111a, in place of the deleted code 52.

In the server 100, in response to the change request 62, the code correction management unit 120 applies contents of the corrected code 53 to the master code 111a. That is, the code correction management unit 120 deletes the code corresponding to the deleted code 52 from the master code 111a, and inserts the corrected code 53 to the place where the deleted code was present. This generates the master code 111b of the version "V1.2". At this time, the code correction management unit 120 assigns the change ID to the correction processing that applies the corrected code 53. In the example illustrated in FIG. 11, the change ID "C002" is assigned.

When the corrected code 53 is applied to the master code 111a, the code attribute identification unit 150 updates the code attribute information management table 114. For example, when the corrected code 53 is applied, the code attribute identification unit 150 deletes records of line numbers "4" to "7" from the uncorrected code attribute information management table 114. The code attribute identification unit 150 adds records of the line numbers "4" to "5" corresponding to the corrected code 53 to the code attribute information management table 114. The command line indicated in the corrected code 53 is set in the command column of added record. In each of the added records, the change ID is "C002", the date and time is "2018.1.6" (Jan. 6, 2018), and the coder is "Coder B".

Figure 12:
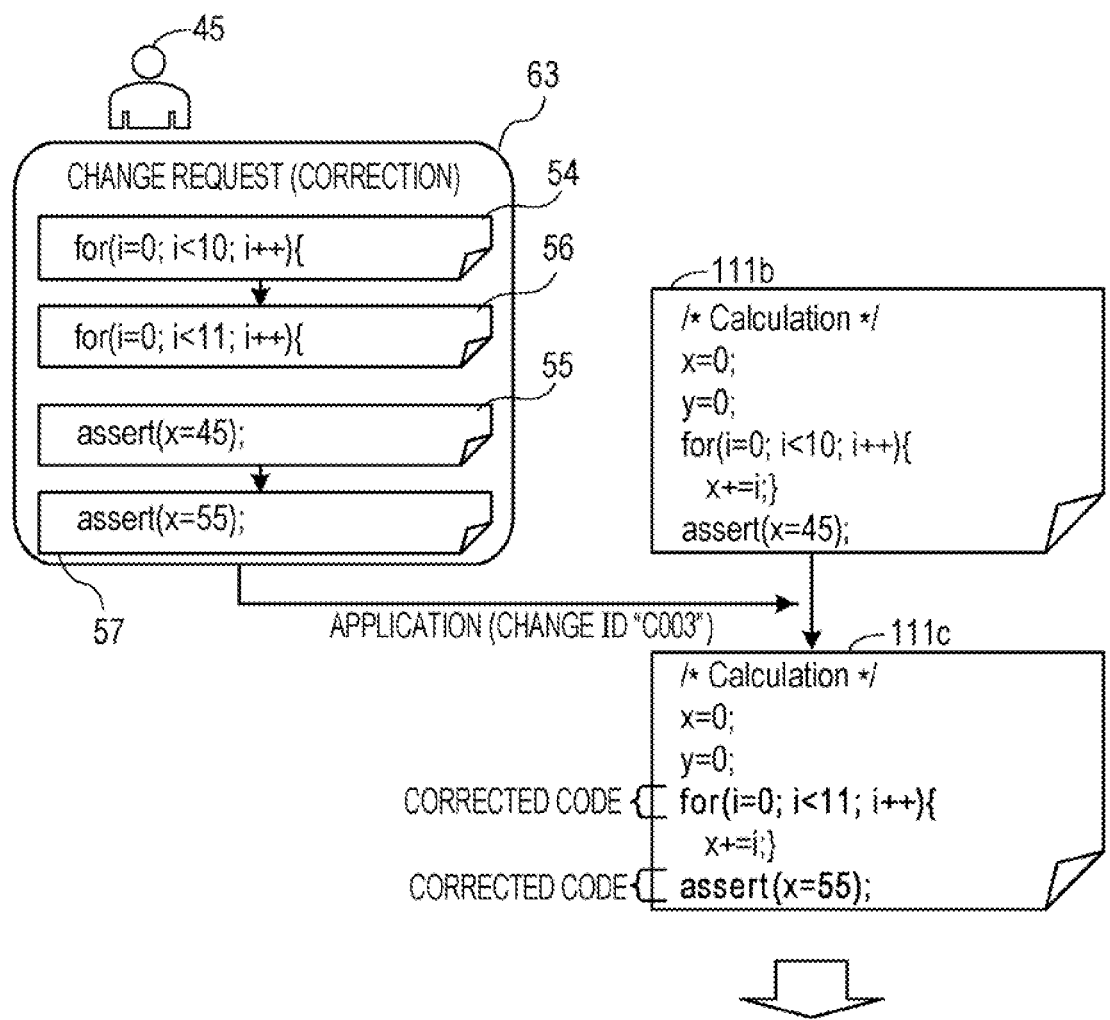
FIG. 12 is a diagram illustrating a third update example of the code attribute information management table.

FIG. 12 is a diagram illustrating a third update example of the code attribute information management table. It is assumed that a developer 45 (name "Coder C") created corrected codes 56, 57 with respect to the master code 111b of the version "V1.2". The corrected codes 56, 57 are partial codes inserted to the place where the partial codes in the master code 111*b* (deleted codes 54, 55) were deleted. In this case, the developer 45 uses the terminal device to transmit a change request 63 requesting correction from the deleted codes 54, 55 to the corrected codes 56, 57 to the server 100. The change request 63 includes the deleted codes 54, 55 and the corrected codes 56, 57. The change request 63 may indicate the line number of the deleted codes 54, 55 in the master code 111*b*, in place of the deleted codes 54, 55.

In the server 100, in response to the change request 63, the code correction management unit 120 applies contents of the corrected codes 56, 57 to the master code 111*b*. That is, the code correction management unit 120 deletes codes corresponding to the deleted codes 54, 55 from the master code 111*b*, and inserts the corrected codes 56, 57 to the place where the deleted codes were present. This generates the master code 111*c* of the version "V1.3". At this time, the code correction management unit 120 assigns the change ID to the correction processing of applying the corrected codes 56, 57. In the example illustrated in FIG. 12, the change ID "C003" is assigned.

When the corrected codes 56, 57 are applied to the master code 111*a*, the code attribute identification unit 150 updates the code attribute information management table 114. For example, when the corrected codes 56, 57 are applied, the code attribute identification unit 150 deletes records of the line numbers "4", "6" from the uncorrected code attribute information management table 114. The code attribute identification unit 150 adds the records of the line numbers "4", "6" corresponding to the corrected codes 56, 57 to the code attribute information management table 114. The command line indicated in the corrected codes 56, 57 is set in the added record command column. In each of the added records, the change ID is "C003", the date and time is "2018.1.9" (Jan. 9, 2018), and the coder is "Coder C".

The code correction management unit 120 registers contents of the correction processing as illustrated in FIGS. 10 to 12 as the correction record 112*a*, 112*b*, . . . in the code correction history management table 112. When the master code is corrected, the code correction management unit 120 registers the master code of the new version in the master code management table 113.

At code development, the code correction history management table 112, the master code management table 113, and the code attribute information management table 114 are updated each time the code is corrected in the development process of code.

Figure 13:
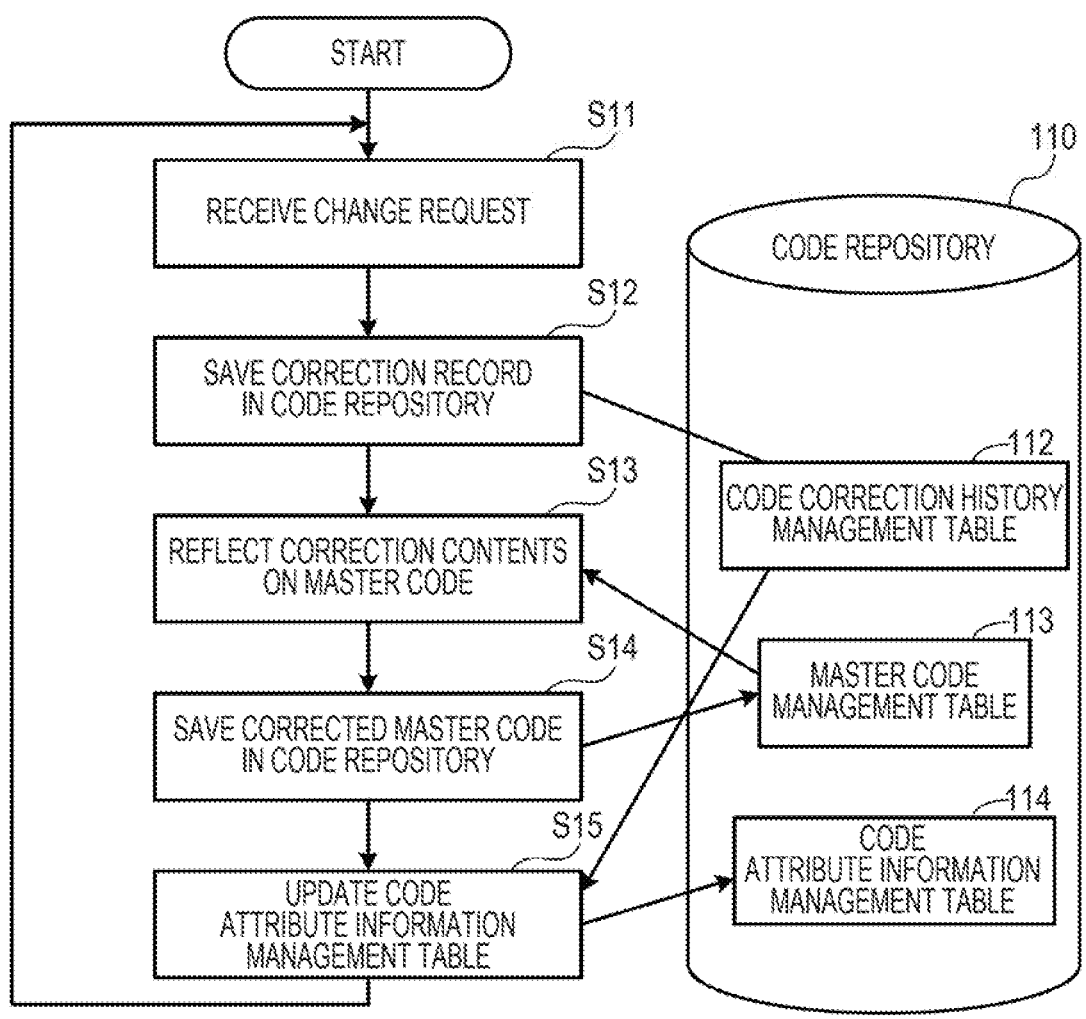
FIG. 13 is a flow chart illustrating an example of a procedure at code development.

FIG. 13 is a flow chart illustrating an example of a procedure at code development. Hereinafter, processing illustrated in FIG. 13 will be described in the order of step numbers.

[Step S11] The code correction management unit 120 receives a change request of master code from the terminal device used by the developer.

[Step S12] The code correction management unit 120 saves a correction record corresponding to code correction indicated in the change request in the code repository 110. For example, the code correction management unit 120 adds a record to which a new change ID was assigned to the code correction history management table 112. The code correction management unit 120 sets the current date and time as the application date and time in the added record. The code correction management unit 120 sets the name of the developer who transmits the change request as the coder in the added record. The code correction management unit 120 sets the corrected code indicated in the change request as the added contents in the added record. If the change request indicates the deleted code, the code correction management unit 120 sets the deleted code indicated in the change request as the deleted contents in the added record.

[Step S13] The code correction management unit 120 reflects correction contents corresponding to the change request on the master code. For example, code correction management unit 120 acquires code contents of the master code of the latest version from the master code management table 113. The code correction management unit 120 applies correction corresponding to the change request (deletion of partial code or addition of partial code) to the acquired code contents.

[Step S14] The code correction management unit 120 saves the corrected master code in the code repository 110. For example, the code correction management unit 120 adds a record to which a new version number was assigned to the master code management table 113. The code correction management unit 120 sets the current date and time as the creation date and time in the added record. The code correction management unit 120 sets the change ID of the correction record saved in Step S12 as the finally applied change ID in the added record. The code correction management unit 120 sets the corrected master code as the code contents in the added record. The code correction management unit 120 may set information (file path and file name) representing the source file describing the corrected master code as the code contents in the added record.

[Step S15] The code attribute identification unit 150 updates the code attribute information management table 114. For example, if the partial code is deleted from the source code in response to the change request, the code attribute identification unit 150 deletes a record in the code attribute information management table 114, which corresponds to each command line in the deleted partial code. The code attribute identification unit 150 adds a record corresponding to each command line in the partial code added in response to the change request to the code attribute information management table 114. The code attribute information management table 114 sets the line number of the corresponding command line as the line number in the added record. The code attribute information management table 114 sets the command added to the corresponding command line as the command in the added record. The code attribute information management table 114 sets the change ID in the correction record saved in Step S12 as the change ID in the added record. The code attribute information management table 114 sets the current date and time as the date and time in the added record. The code attribute information management table 114 sets the name of the developer using the terminal device that transmits the change request as the coder in the added record.

When updating of the code attribute information management table 114 is terminated, the procedure proceeds to Step S11, and the server 100 waits for reception of a next change request.

In this manner, each table stored in the code repository 110 is updated each time the developer corrects the partial code. The server 100 may identify the partial code that is a candidate for the refactoring target in the master code of any version, based on each table in the code repository 110.

It is assumed that the developer 41 refactors the master code 111*c* of the version "V1.3". In this case, the developer 41 uses the terminal device 31 to transmit a refactoring candidate identification request designating the master code 111*c* of the version "V1.3" to the server 100. In response to the refactoring candidate identification request, the server 100 identifies a partial code that is likely to be the refactoring target from the master code 111c, and determines the identified partial code as the refactoring candidate.

Hereinafter, the refactoring candidate identification processing will be specifically described.

Based on the correction record of the partial code, the refactoring target identification unit 130 first identifies the partial code (refactoring code) corrected by refactoring and the original partial code (refactored code) to be corrected by refactoring. Conditions for the refactoring code are as follows.

(Condition a) Any deleted partial code (deleted code) is present.

(Condition b) The test code (for example, assert statement) is not changed.

The refactoring target identification unit 130 determines the partial code that satisfies both of the condition a and the condition b as the refactoring code.

The condition that the partial code is the refactored code is as follows.

(Condition c) After the concerned partial code was created in the partial code under examination of the refactored code or not, one or more command lines corrected by another refactoring code are present.

The refactoring target identification unit 130 determines the partial code that satisfies the condition c as the refactored code.

FIG. 14 is a diagram illustrating a first example of refactoring target identification processing. FIG. 14 illustrates processing of identifying the refactoring target related to the correction processing having the change ID "C002".

In the correction processing having the change ID "C002", the partial code added in the change ID "C001" is deleted, and a new partial code is added. Accordingly, the condition a is satisfied. In the correction processing having the change ID "C002", the assert statement that is the test code is not changed. Accordingly, the condition b is satisfied. As a result, the refactoring target identification unit 130 determines the partial code added in the correction processing having the change ID "C002" as the refactoring code.

A part of the command line in the partial code added in the correction processing having the change ID "C001" is changed by the refactoring code in the correction processing having the change ID "C002". Accordingly, the condition c is satisfied. As a result, the refactoring target identification unit 130 determines the partial code added in the change ID "C001" as the refactored code.

FIG. 15 is a diagram illustrating a second example of the refactoring target identification processing. FIG. 15 illustrates the refactoring target identification processing related to the correction processing having the change ID "C003".

In the correction processing having the change ID "C003", the command line "for (i=0; i<10; i++){" added in the change ID "C002" is deleted, and a new command line "for (i=0; i<11; i++){" is added. Accordingly, the condition a is satisfied. However, in the correction processing having the change ID "C003", the assert statement that is the test code is changed. Accordingly, the condition b is not satisfied. As a result, the refactoring target identification unit 130 determines that the partial code added in the correction processing having the change ID "C003" is not the refactoring code.

Since the partial code added in the correction processing having the change ID "C003" is not the refactoring code, the condition c may not be satisfied. As a result, the refactoring target identification unit 130 determines that the partial code added in the change ID "C002" is changed in the correction processing having the change ID "C003", but is not the refactored code.

The refactoring target identification unit 130 generates refactoring target information based on a result of the refactoring target identification processing.

FIG. 16 is a diagram illustrating an example of the refactoring target information. Refactoring target information 131 has columns for change ID, refactoring code or not, refactoring target, refactored code or not, and refactoring correction processing.

The change ID of correction processing is set in the change ID column.

Information indicating whether or not the partial code added in the corresponding correction processing is the refactoring code is set in the refactoring code or not column. For example, if the added code is the refactoring code, "Yes" is set in the refactoring code or not column. If the added partial code is not the refactoring code, "No" is set in the refactoring code or not column.

If the partial code added in corresponding correction processing is the refactoring code, the change ID of the correction processing including the refactored code corrected by the refactoring code as the added code is set in the refactoring target column.

Information indicating whether or not the partial code added in corresponding correction processing is the refactored code in another correction processing is set in the refactored code or not column. For example, if the added partial code is the refactored code, "Yes" is set in the refactored code or not column. If the added partial code is not the refactored code, "No" is set in the refactored code or not column.

In the case where the partial code added in corresponding correction processing is the refactored code, the change ID in the correction processing that corrected the refactored code is set in the refactoring correction processing column.

In the example illustrated in FIG. 16, the record having the change ID "C001" indicates that the partial code added to corresponding correction processing is the refactored code, and the concerned code is corrected in the correction processing having the change ID "C002". The record having the change ID "C002" indicates that the partial code added in corresponding correction processing is the refactoring code, and target to be corrected by the concerned partial code is the partial code added in the change ID "C001".

The refactoring target identification unit 130 transmits the generated refactoring target information 131 to the suspected attribute identification unit 140. The suspected attribute identification unit 140 uses the refactoring target information 131 to identify the suspected coder or the suspected period.

Figure 17:
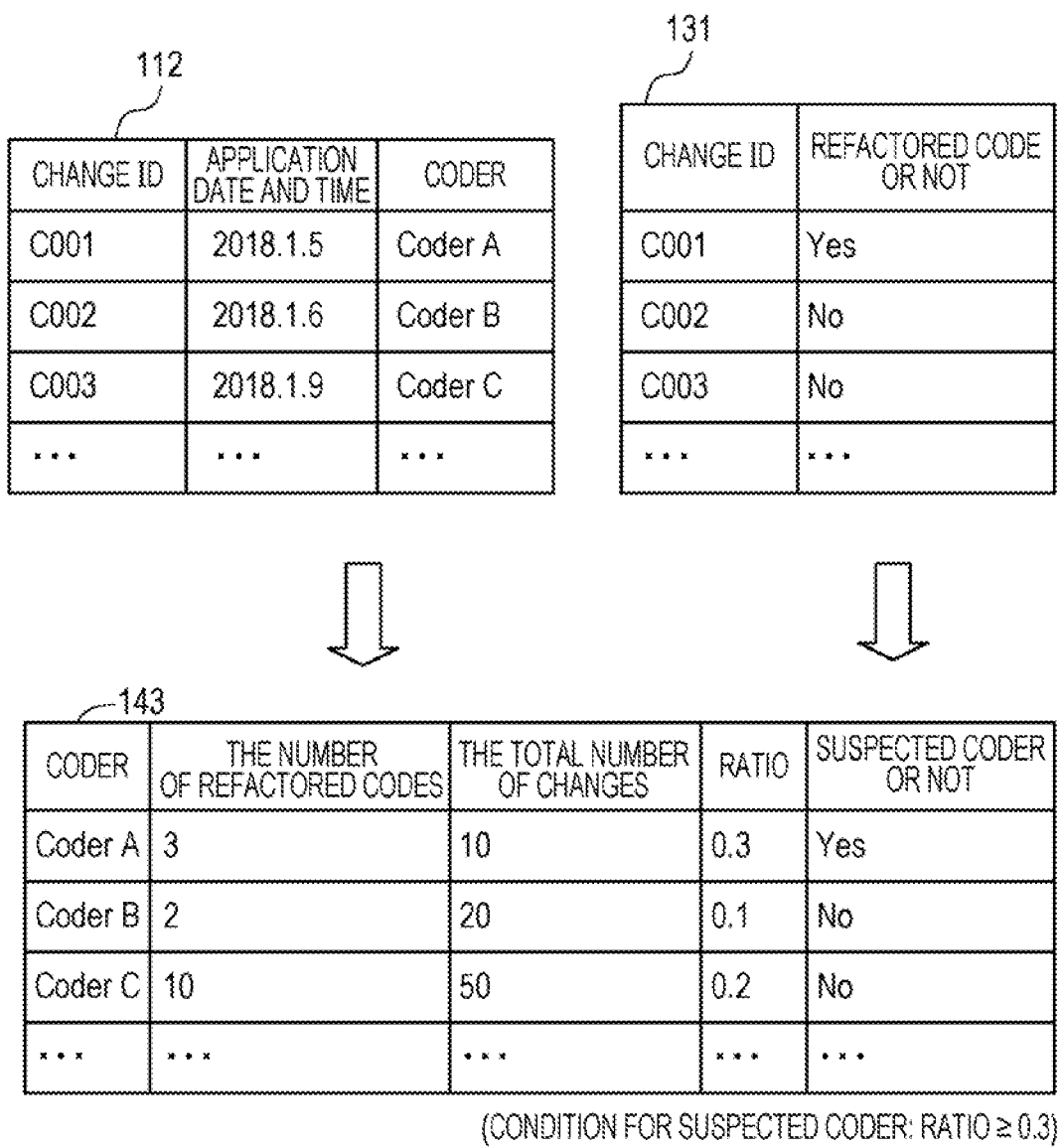
FIG. 17 is a diagram illustrating a specific example of a suspected coder.

FIG. 17 is a diagram illustrating a specific example of the suspected coder. The suspected coder identification unit 141 of the suspected attribute identification unit 140 calculates the number and ratio of the refactored codes determined as the refactoring target for each developer, based on the code correction history management table 112 and the refactoring target information 131.

For example, the suspected coder identification unit 141 refers to the code correction history management table 112 to count the total number of changes for each developer. The suspected coder identification unit 141 refers to the code correction history management table 112 and the refactoring target information 131 to count the number of times (the number of refactored codes) the partial code created by the developer was determined as the refactored code for each developer. The suspected coder identification unit 141 calculates the ratio at which the partial code created by the developer was determined as the refactored code for each developer.

The suspected coder identification unit 141 determines, for example, the developer having the calculated ratio of a predetermined threshold value or more as the suspected coder. The suspected coder identification unit 141 determines whether or not all developers are the suspected coder, and generates suspected coder information 143 indicating a determination result.

The suspected coder information 143 has columns for coder, the number of refactored codes, the total number of changes, ratio, and suspected coder or not. The name of the developer is set in the coder column. The number of refactored codes among partial codes added by the developer is set in the number of refactored codes column. The number of times the developer performed code correction (the total number of changes) is set in the total number of changes column. The ratio of the number of refactored codes to the total number of changes by the developer is set in the ratio column. Whether the developer is the suspected coder or not is set in the suspected coder or not column. For example, if the developer is the suspected coder, "Yes" is set in the suspected coder or not column. If the developer is not the suspected coder, "No" is set in the suspected coder or not column.

FIG. 17 illustrates an example in which the developer having the ratio of the number of refactored codes to the total number of changes is 0.3 or more is determined as the suspected coder. In this case, the developer "Coder A" is the suspected coder, but the developers "Coder B" and "Coder C" are not the suspected coders.

The suspected coder identification unit 141 may determine the developer having the number of refactored codes of a predetermined value or more as the suspected coder. The suspected coder identification unit 141 may determine a predetermined number of top developers having the ratio or the number of refactored codes as the suspected coders.

Figure 18:
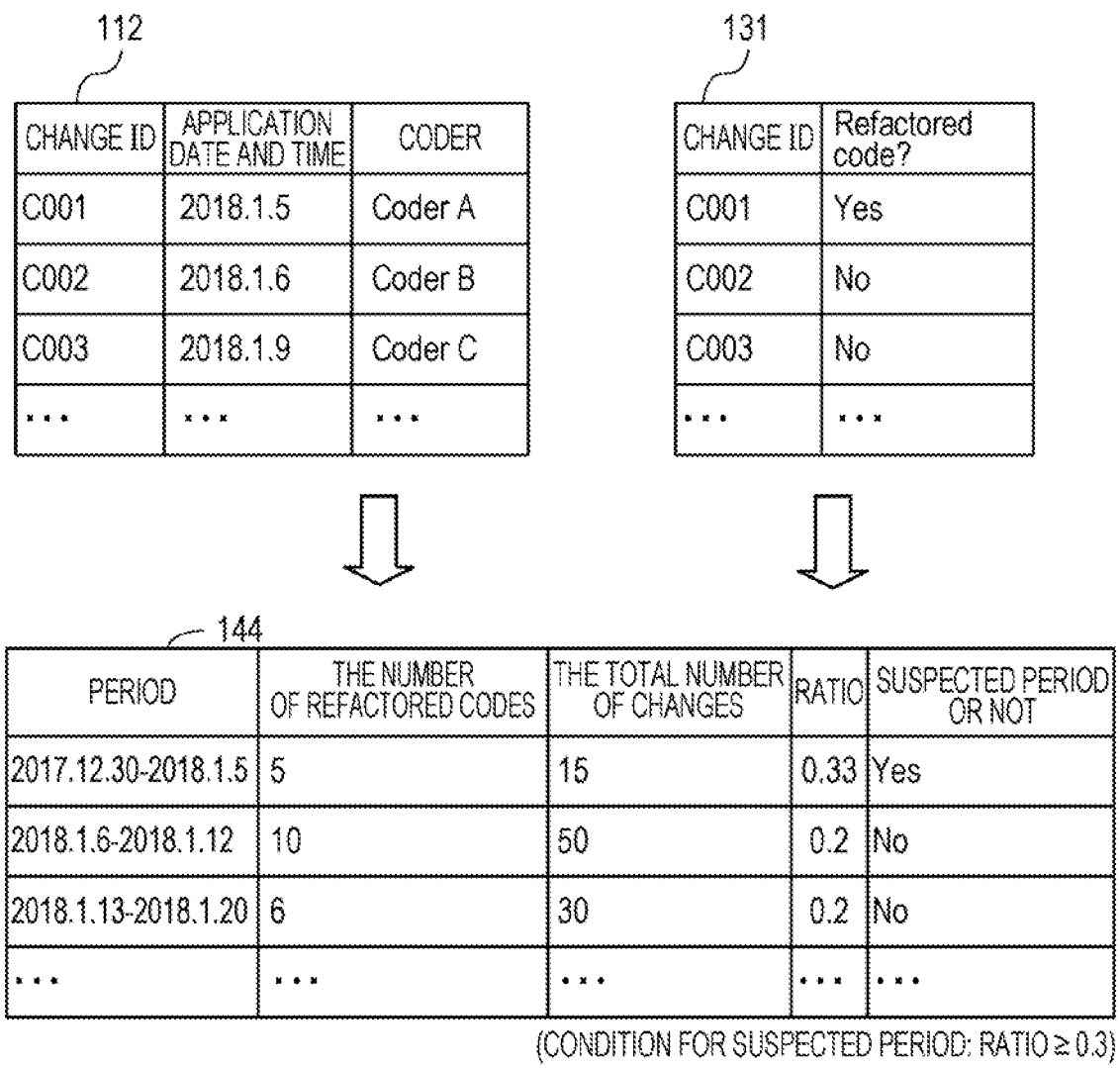
FIG. 18 is a diagram illustrating a specific example of a suspected period.

FIG. 18 is a diagram illustrating a specific example of the suspected period. The suspected period identification unit 142 of the suspected attribute identification unit 140 identifies the period during which the date and time when the refactored code that would be the refactoring target was created concentrates, as the suspected period. For example, the suspected period identification unit 142 refers to the code correction history management table 112 to count the total number of changes of the source code during a concerned period for each period. The suspected period identification unit 142 refers to the code correction history management table 112 and the refactoring target information 131 to count the number of times the code created during a concerned period was determined as the refactored code (the number of refactored codes) for each period. Then, the suspected period identification unit 142 calculates the ratio at which the partial code created during a concerned period was determined as the refactored code for each period.

The suspected period identification unit 142, for example, determines a period during which the calculated ratio becomes a predetermined threshold value or more as the suspected period. The suspected period identification unit 142 determines whether or not all periods are the suspected period, and generates suspected period information 144 indicating a determination result.

The suspected period information 144 has columns for period, the number of refactored codes, the total number of changes, ratio, and suspected period or not. The period to be determined (start date and time and end date and time) is set in the period column. The number of refactored codes in the partial codes added during the period to be determined is set in the number of refactored codes column. The number of times code correction was performed during the period to be determined (the total number of changes) is set in the total number of changes column. The ratio of the number of refactored codes to the total number of changes during the period to be determined is set in the ratio column. Whether or not the period to be determined is the suspected period is set in the suspected period or not column. For example, if the period to be determined is the suspected period, "Yes" is set in the suspected period or not column. If the period to be determined is not the suspected period, "No" is set in the suspected period or not column.

FIG. 18 illustrates an example in which the ratio of the number of refactored codes to the total number of changes is 0.3 or more is determined as the suspected period. In this case, the period "2017.12.30-2018.1.5" is the suspected period, and the period "2018.1.6-2018.1.12" and "2018.1.13-2018.1.20" are not the suspected period.

The suspected period identification unit 142 may determine the period having the number of refactored codes of a predetermined value or more as the suspected period. Further, the suspected period identification unit 142 may determine a predetermined number of top periods having the ratio or the number of refactored codes as the suspected periods.

When the suspected coder and the suspected period are identified, the refactoring candidate extraction unit 160 extracts the refactoring candidate from the source code.

Figure 19:
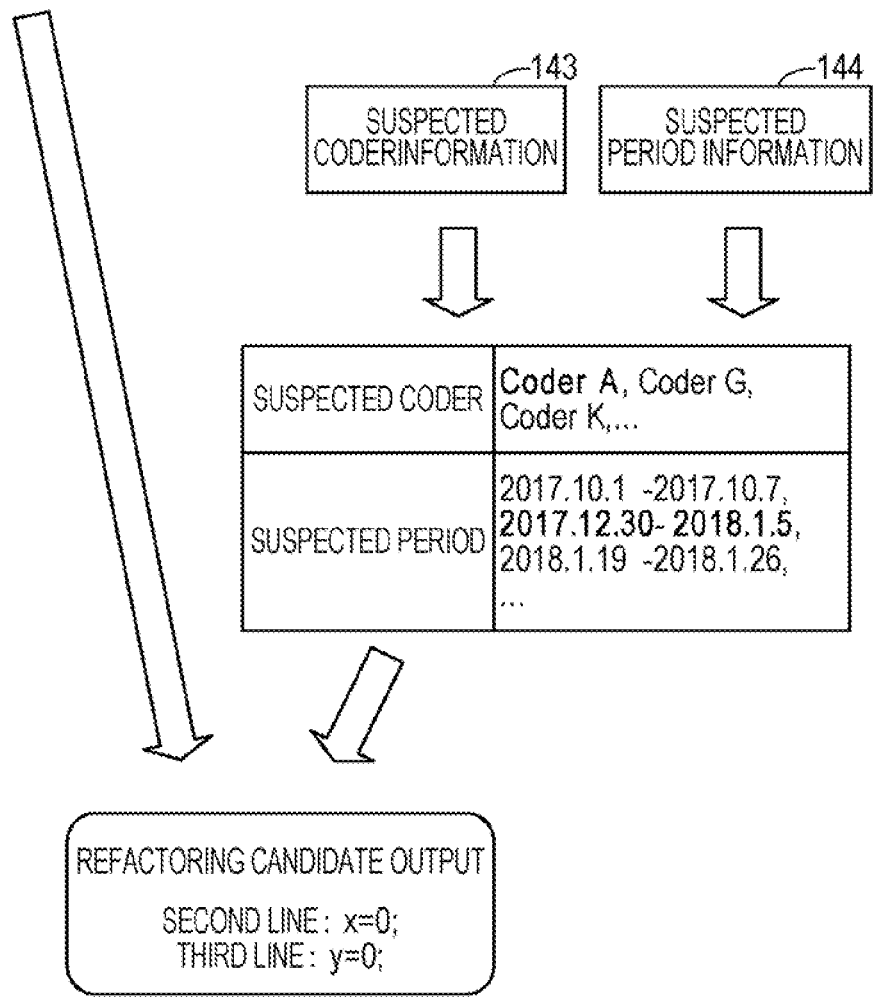
FIG. 19 is a diagram illustrating an example of extraction of a refactoring candidate.

FIG. 19 is a diagram illustrating an example of extraction of the refactoring candidate. FIG. 19 illustrates an extraction example of the refactoring candidate from the source code of the version "V1.3".

The refactoring candidate extraction unit 160 acquires the name of the suspected coder from the suspected coder information 143. The refactoring candidate extraction unit 160 acquires information indicating the suspected period from the suspected period information 144. Next, the refactoring candidate extraction unit 160 refers to the code attribute information management table 114 to extract the command line created by the suspected coder and the command line created during the suspected period. Then, the refactoring candidate extraction unit 160 outputs, for example, the line number of the extracted command line and the command. For example, the outputted information is transmitted to the terminal device used by the developer who performs refactoring, and displayed on a screen of the terminal device.

In this manner, among partial codes that were created by the developer who created many refactored codes or created during the period when many refactored codes were added, the partial code that remains in the source code of the noted version is displayed. Referring to the outputted result, the developer checks the concerned code and related code in the source code to determine whether or not refactoring is performed.

In the example illustrated in FIG. 19, "second line: x=0;" and "third line: y=0;" are extracted as the refactoring candidate. The developer checks description related to these command lines in the source code. Then, for example, the developer may find that a variable y in the source code of the version "V1.3" is set on the third line, but is not used in other places. That is, the third command line may be deleted. When determining that the third command line may be deleted, the developer uses the terminal device to transmit the change request to delete the command line to the server 100.

If there are a plurality of suspected code attributes such as the suspected coder and the suspected period, for example, the refactoring candidate extraction unit 160 identifies the refactoring candidate based on a logical product (AND) of the suspected code attributes. The refactoring candidate extraction unit 160 may identify the refactoring candidate based on a logical sum (OR) of the suspected code attributes.

Figure 20:
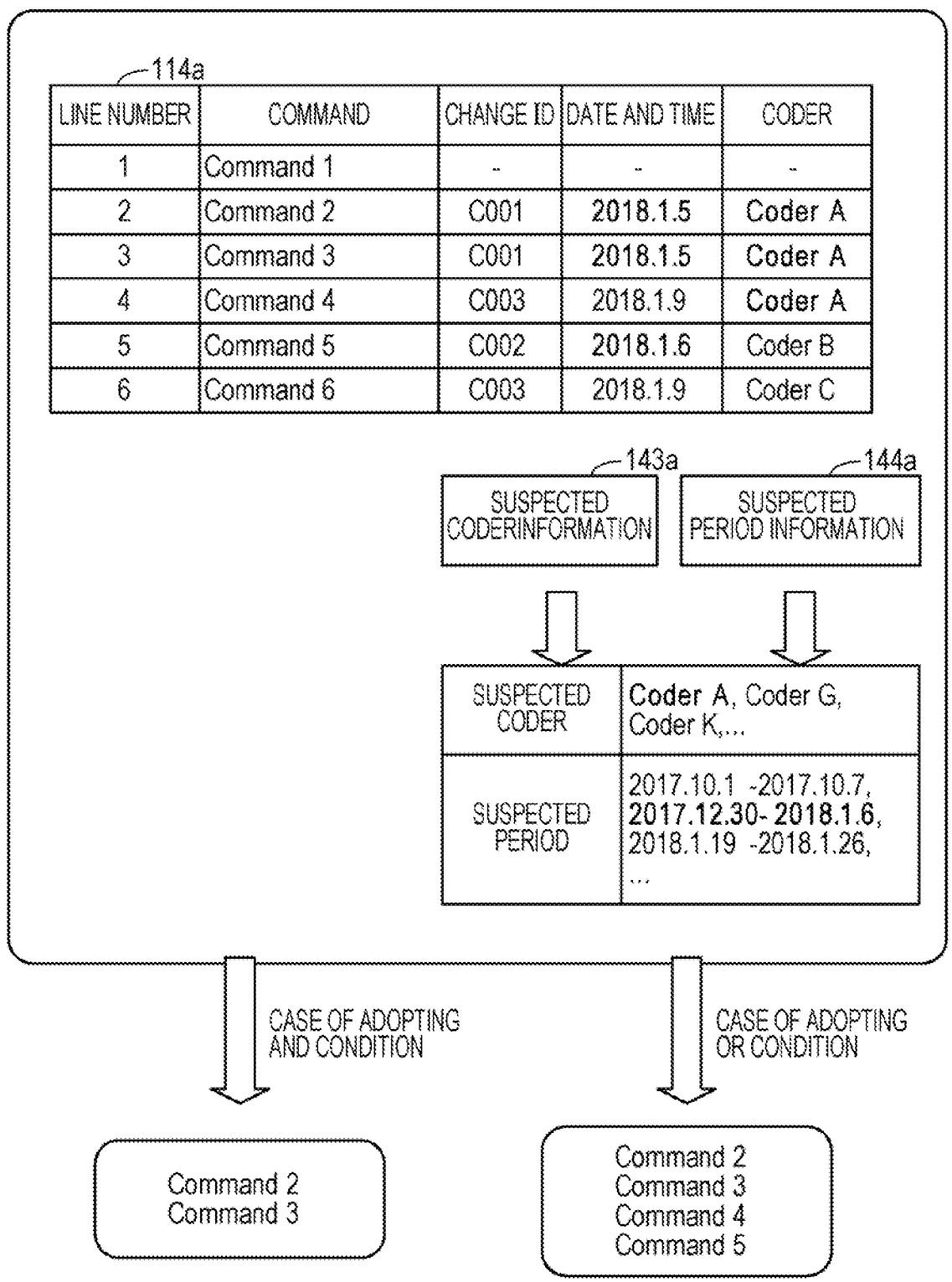
FIG. 20 is a diagram illustrating a difference in output results between the case of adopting a logical product of suspected code attributes and the case of a logical sum of the suspected code attributes.

FIG. 20 is a diagram illustrating a difference in output results between the case of adopting the logical product of the suspected code attributes and the case of the logical sum of the suspected code attributes. In the example illustrated in FIG. 20, the "Coder A" and so on are represented as the suspected coders in the suspected coder information 143a. "2017.12.30-2018.1.6" and so on are represented as the suspected periods in the suspected period information 144a.

On the other hand, the code attribute information management table 114a indicates that the developer "Coder A" created the command lines having line numbers "2", "3" on the date and time "2018.1.5". The code attribute information management table 114a indicates that the developer "Coder A" created the command line having the line number "4" on the date and time "2018.1.9". Further, the code attribute information management table 114a indicates that the developer "Coder B" created the command line having the line number "5" on the date and time "2018.1.6".

Here, if the logical product (AND) of the suspected code attributes is adopted as the extraction condition for the refactoring candidate, the command line that corresponds to both of the suspected coder and the suspected period is extracted as the refactoring candidate. In the example illustrated in FIG. 20, "Command 2", "Command 3" in the command lines having the line numbers "2", "3" are extracted as the refactoring candidates.

Here, if the logical sum (OR) of the suspected code attributes is adopted as the extraction condition for the refactoring candidate, the command line that corresponds to both of the suspected coder and the suspected period is extracted as the refactoring candidate. In the example illustrated in FIG. 20, "Command 2", "Command 3", "Command 4", "Command 5" in the command lines having the line numbers "2" to "5" are extracted as the refactoring candidates.

Next, a procedure of refactoring candidate extraction processing will be described in detail. The refactoring candidate extraction processing is executed, for example, in response to an input of the refactoring candidate identification request from the terminal device used by the developer performing refactoring.

Figure 21:
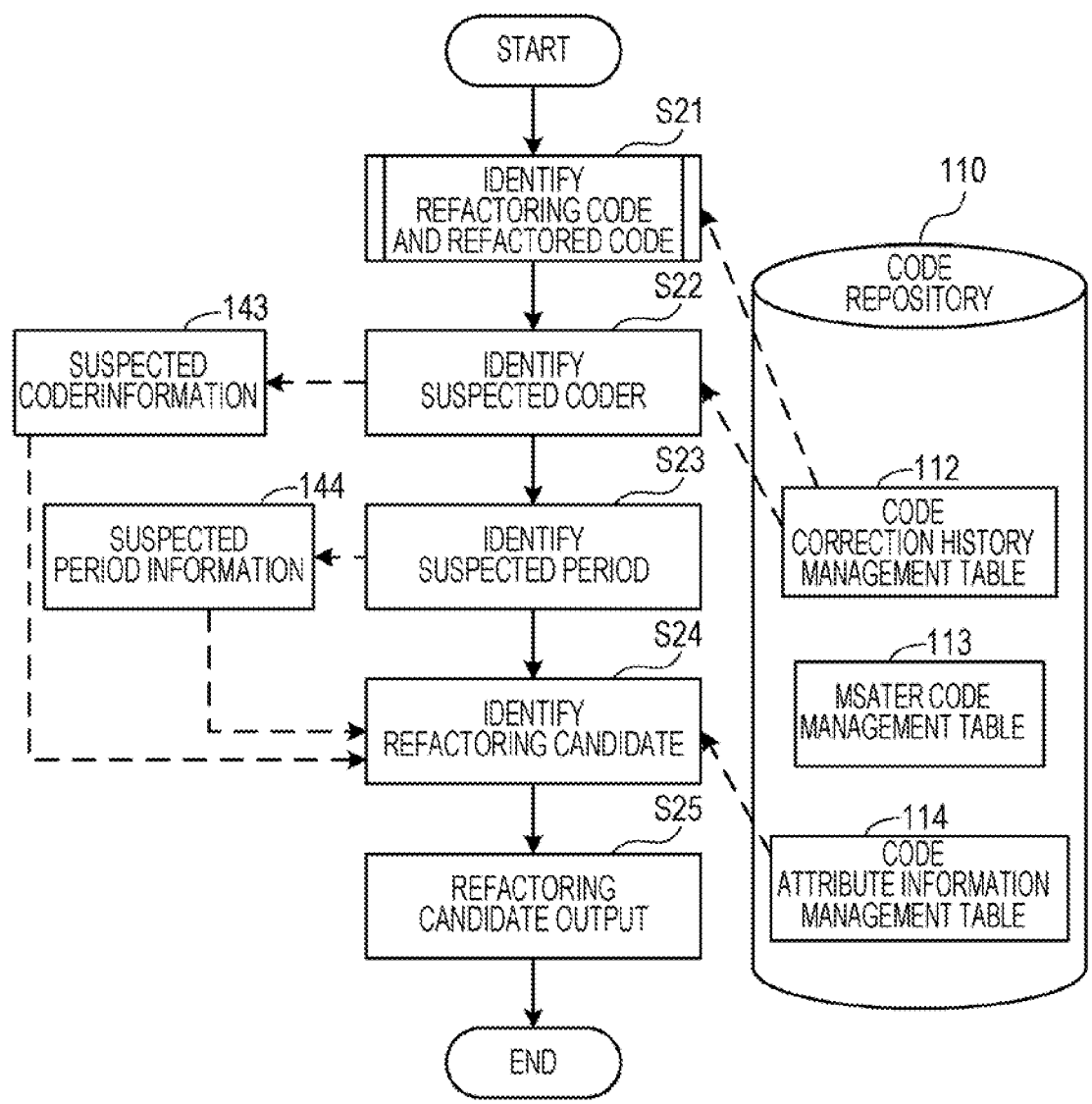
FIG. 21 is a flow chart illustrating an example of a procedure of refactoring candidate extraction processing.

FIG. 21 is a flow chart illustrating an example of a procedure of the refactoring candidate extraction processing. The processing illustrated in FIG. 21 will be described below according to step numbers.

[Step S21] The refactoring target identification unit 130 refers to the code correction history management table 112 to identify the refactoring code and the refactored code from the partial codes added to the source code by code correction. Then, the refactoring target identification unit 130 generates the refactoring target information 131 indicating the refactoring code and the refactored code. Details of the refactoring code and the refactored code identification processing will be described later (see FIG. 22).

[Step S22] The suspected coder identification unit 141 acquires the refactoring target information 131 from the refactoring target identification unit 130, and identifies the suspected coder based on the acquired refactoring target information 131 and the code correction history management table 112. For example, the suspected coder identification unit 141 counts the number of refactored codes and the total number of changes for each developer. Then, the suspected coder identification unit 141 divides the number of refactored codes by the total number of changes for each developer, and calculates the ratio at which the added code created by the developer is the refactored code. The suspected coder identification unit 141 compares the calculated ratio with a predetermined threshold value for each developer, and if the ratio is equal to or larger than the threshold value, identifies the concerned developer as the suspected coder. When identifying the suspected coder, the suspected coder identification unit 141 associates the suspected coder information 143 with the name of the suspected coder, and "Yes" is set in the suspected coder or not column.

[Step S23] The suspected period identification unit 142 acquires the refactoring target information 131 from the refactoring target identification unit 130, and identifies the suspected period based on the acquired refactoring target information 131 and the code correction history management table 112. For example, the suspected period identification unit 142 counts the number of refactored codes and the total number of changes for each period. Then, the suspected period identification unit 142 divides the number of refactored codes by the total number of changes for each period, and calculates a ratio at which the added code created in the period is the refactored code. The suspected period identification unit 142 compares the calculated ratio with a predetermined threshold value for each period, and if the ratio is equal to or higher than a threshold value, identifies the concerned period as the suspected period. When identifying the suspected period, the suspected period identification unit 142 associates the suspected period information 144 with the suspected period, and "Yes" is set in the suspected period or not column.

[Step S24] The refactoring candidate extraction unit 160 refers to the suspected coder information 143, the suspected period information 144, and the code attribute information management table 114 to identify the partial code that will be the refactoring candidate from the source code. For example, if the extraction condition is the logical product, the refactoring candidate extraction unit 160 extracts a record including the name of the suspected coder indicated in the suspected coder information 143 and the date and time during the suspected period indicated in the suspected period information 144 from the code attribute information management table 114. If the extraction condition is the logical sum, the refactoring candidate extraction unit 160 extracts a record including the name of the suspected coder indicated in the suspected coder information 143 and the date and time during the suspected period indicated in the suspected period information 144 from the code attribute information management table 114. The refactoring candidate extraction unit 160 identifies the command line indicated in the extracted record as the refactoring candidate.

[Step S25] The refactoring candidate extraction unit 160 outputs the identified refactoring candidate. For example, the refactoring candidate extraction unit 160 transmits information indicating the command line of the refactoring candidate to the terminal device used by the developer performing refactoring.

As described above, the refactoring candidate is identified. Since the refactoring candidate is automatically identified, the developer performing refactoring may carefully examine the part related to the refactoring candidate in the master code, improving working efficiency.

Next, details of the refactoring code and refactored code identification processing will be described.

Figure 22:
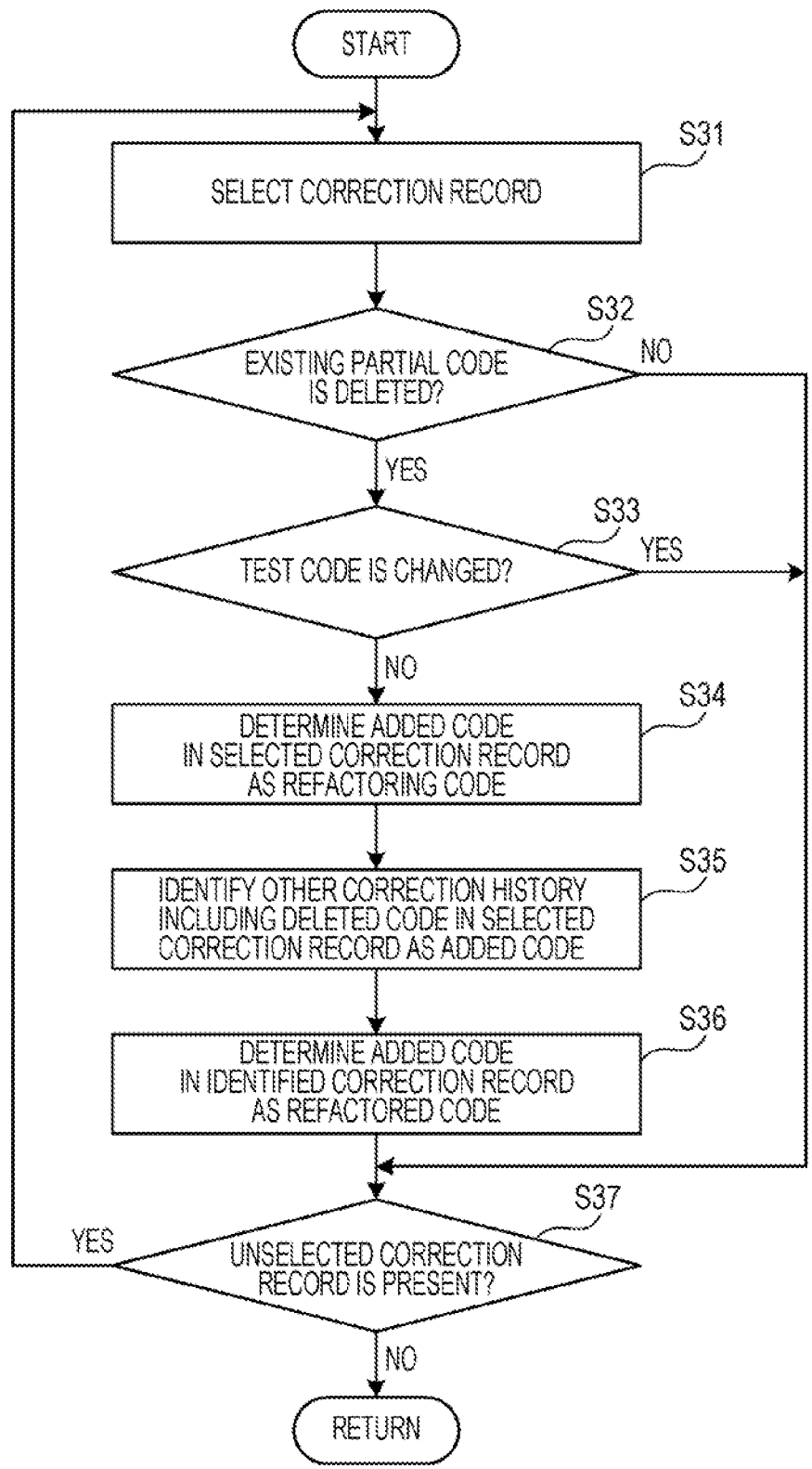
FIG. 22 is a flow chart illustrating an example of a refactoring code and refactored code identification processing.

FIG. 22 is a flow chart illustrating an example of the refactoring code and a procedure of the refactored code identification processing.

[Step S31] The refactoring target identification unit 130 selects one unselected correction record from the code correction history management table 112.

[Step S32] The refactoring target identification unit 130 determines whether or not deletion of existing partial code is included in correction contents indicated in the selected correction record. For example, if the command line as deleted contents is set in the selected correction record in the code correction history management table 112, the refactoring target identification unit 130 determines that deletion of existing partial code is included. If deletion of the existing partial code is included, the refactoring target identification unit 130 proceeds the procedure to Step S32. If deletion of existing partial code is not included, the refactoring target identification unit 130 proceeds the procedure to Step S37.

[Step S33] The refactoring target identification unit 130 determines whether or not a change in the test code is included in correction contents indicated in the selected correction record. For example, if a value of a variable indicated in the added assert statement in the correction record is different from a value of a variable indicated in the deleted assert statement, the refactoring target identification unit 130 determines that the test code is changed. If the test code is changed, the refactoring target identification unit 130 proceeds the procedure to Step S37. If the test code is not changed, the refactoring target identification unit 130 recognizes that a change in input/output by correction is not present, proceeds the procedure to Step S34.

[Step S34] The refactoring target identification unit 130 identifies the added code in the extracted correction record as the refactoring code. At this time, the refactoring target identification unit 130, for example, associates the refactoring target information 131 with the change ID of the selected correction record, and "Yes" is set in the refactoring code or not column.

[Step S35] The refactoring target identification unit 130 identifies another correction record including the deleted code deleted by correction in the selected correction record as the added code, based on the code correction history management table 112.

[Step S36] The refactoring target identification unit 130 identifies the added code in the identified correction record as the refactored code. At this time, the refactoring target identification unit 130 associates the refactoring target information 131 with the change ID of the correction record indicating the correction processing that added the refactored code, and "Yes" is set in the refactored code or not column.

[Step S37] The refactoring target identification unit 130 determines whether or not any unselected correction record is present. If the unselected correction record is present, the refactoring target identification unit 130 proceeds the procedure to Step S31. If all of the correction record has been selected, the refactoring target identification unit 130 terminates the refactoring code and refactored code identification processing.

In this manner, the refactoring code and the refactored code may be correctly identified. The refactored code may be correctly identified, improving the accuracy of analyzing attributes of the code that is likely to be the refactored code. As a result, the refactoring candidate may be determined with high accuracy.

Other Embodiments

In the second embodiment, the server 100 generates the code attribute information management table 114 at code development, but may generate the code attribute information management table 114 at extraction of the refactoring candidate. In this case, the code attribute identification unit 150 of the server 100 reproduces the correction processing applied to the source code based on the correction record of the source code. Then, code attribute identification unit 150 updates the code attribute information management table 114 at each reproduced correction processing, thereby generating the code attribute information management table 114 at creation of the source code of any version.

Although the embodiments have been described, the configurations of the units described in the embodiments are able to be replaced with other units having the same functions. Any other constituents or processes may be added. Any two or more configurations (features) of the aforementioned embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
   storing, in a memory, for each of a plurality of correction processings applied to a source code, a correction record that includes at least one of a deleted code deleted in the correction processing, an added code added in the correction processing, and attribute information indicating an attribute related to the correction processing;
   comparing the deleted code with the added code in the correction records of the plurality of correction processings;
   identifying, from the plurality of correction processings, a first correction processing that is refactoring to correct a first partial code within the source code without changing input/output of the first partial code;
   based on a first correction record relating to the first correction processing, identifying a second correction processing whose added code includes the deleted code deleted in the first correction processing;
   based on the attribute information indicated in a second correction record relating to the second correction processing, determining a suspected attribute indicating an attribute of a partial code that is a refactoring candidate; and
   outputting, as the refactoring candidate, a second partial code that has been added in a third correction processing associated with the suspected attribute.

2. The non-transitory, computer-readable recording medium of claim 1, wherein
a correction processing whose correction record includes the deleted code and in which a test code remains unchanged is identified as the first correction processing.

3. The non-transitory, computer-readable recording medium of claim 1, wherein
in the storing of the correction records, the attribute information includes an identifier of a coder of the added code, and
in the determining the suspected attribute, the identifier of the coder of the added code in the second correction record is determined as the suspected attribute.

4. The non-transitory, computer-readable recording medium of claim 1, wherein
in the storing of the correction records, the attribute information includes a date and time when the correction processing corresponding to the correction record was executed, and
in the determining the suspected attribute, a predetermined period including a date and time when the second correction processing indicated in the second correction record was executed is determined as the suspected attribute.

5. A source code analysis device comprising:
a memory configured to store a correction record for each of a plurality of correction processings, each correction processing being applied to a partial code including at least one command line of a source code to change the at least one command line of the partial code, the correction record including an attribute value indicating attribute associated with each correction processing; and
a processor coupled to the memory and configured to:
compare a first correction record for a first correction processing with a second correction record for a second correction processing applied to a first partial code indicated by the first correction record,
determine whether at least one command line has been deleted from the first partial code by the second correction processing to obtain a second partial code,
determine whether a command line of a test code included in the first partial code has been changed by the second correction processing when the at least one command line was deleted from the first partial code,
obtain a first attribute value from the first correction record for automatic determination of a candidate for refactoring when the command line of the test code has been changed when the at least one command line was deleted from the first partial code, and
identify a third partial code indicated by a third correction record having the first attribute value as the candidate for refactoring.

6. The source code analysis device of claim 5, wherein the attribute value includes at least one of an identifier of a coder associated with the first correction record and a date and time at which the first correction processing indicated by the first correction record has been applied to the first partial code.

7. The source code analysis device of claim 6, wherein the first correction record includes the identifier of the coder associated with the first correction record, the data and time of the correction processing indicated by the first correction record, and at least one of an added command line and deleted command line that has been applied to the first partial code.

8. The source code analysis device of claim 7, wherein the processor is configured to:
calculate a ratio of a number of occurrences of the attribute value to a total number of the plurality of correction processings, and
identify the third partial code when the ratio is greater than a threshold value.

9. A computer-implemented method for automatically identifying a partial code including at least one command line within a source code as a candidate for refactoring, the method comprising:
storing, in a memory, a correction record for each of a plurality of correction processings, each correction processing being applied to a partial code including at least one command line of a source code to change the at least one command line of the partial code, the correction record including an attribute value indicating attribute associated with each correction processing;
comparing a first correction record for a first correction processing with a second correction record for a second correction processing applied to a first partial code indicated by the first correction record;
determining whether at least one command line has been deleted from the first partial code by the second correction processing to obtain a second partial code;
determining whether a command line of a test code included in the first partial code has been changed by the second correction processing when the at least one command line was deleted from the first partial code,
obtaining a first attribute value from the first correction record for automatic determination of a candidate for refactoring when the command line of the test code has been changed when the at least one command line was deleted from the first partial code; and
identifying a third partial code indicated by a third correction record having the first attribute value as the candidate for refactoring.

10. The method of claim 9, wherein the attribute value includes at least one of an identifier of a coder associated with the first correction record and a date and time at which the first correction processing indicated by the first correction record has been applied to the first partial code.

11. The method of claim 10, wherein the first correction record includes the identifier of the coder associated with the first correction record, the data and time of the correction processing indicated by the first correction record, and at least one of an added command line and deleted command line that has been applied to the first partial code.

12. The method of claim 11, further comprising:
calculating a ratio of a number of occurrences of the attribute value to a total number of the plurality of correction processings; and
identifying the third partial code when the ratio is greater than a threshold value.

* * * * *